United States Patent [19]

Conner et al.

[11] Patent Number: 5,428,792

[45] Date of Patent: Jun. 27, 1995

[54] SYSTEM FOR PRODUCING LANGUAGE NEUTRAL OBJECTS AND GENERATING AN INTERFACE BETWEEN THE OBJECTS AND MULTIPLE COMPUTER LANGUAGES

[75] Inventors: Mike H. Conner; Andrew R. Martin; Larry K. Raper, all of Austin, Tex.

[73] Assignee: International Business Machines Corporation, Armonk, N.Y.

[21] Appl. No.: 329,798

[22] Filed: Oct. 26, 1994

Related U.S. Application Data

[63] Continuation of Ser. No. 805,668, Dec. 12, 1991, abandoned.

[51] Int. Cl.$^6$ ............................ G06F 9/45; G06F 9/40
[52] U.S. Cl. .................................... 395/700; 395/600; 364/974.5; 364/DIG. 2
[58] Field of Search ........................ 364/900; 395/600

[56] References Cited

U.S. PATENT DOCUMENTS

| | | | |
|---|---|---|---|
| 4,558,413 | 12/1985 | Schmidt et al. | 395/600 |
| 4,667,290 | 5/1987 | Goss et al. | 364/300 |
| 4,672,532 | 6/1987 | JongeVos | 395/600 |
| 4,734,854 | 3/1988 | Afshar | 395/700 |
| 4,791,558 | 12/1988 | Chaitin et al. | 395/500 |
| 4,885,717 | 12/1989 | Beck et al. | 395/775 |
| 4,953,080 | 8/1990 | Dysart et al. | 395/600 |
| 4,989,132 | 1/1991 | Mellender et al. | 395/700 |
| 5,041,992 | 8/1991 | Cunningham et al. | 395/135 |
| 5,111,413 | 5/1992 | Lazansky et al. | 364/578 |
| 5,230,049 | 7/1993 | Chang et al. | 395/700 |
| 5,247,681 | 9/1994 | Janis et al. | 395/700 |

OTHER PUBLICATIONS

Finlayson et al., "Vanguard: A Protocol Suite and OS Kernel for Distributed Object-Oriented Environments", 11–12 Oct. 1990, pp. 42–44, IEEE Workshop On Experimental Distributed Systems.
Koschmann et al., "Bridging the Gap Between Object-Oriented and Logic Programming" Jul. 1988, pp. 36–42 IEEE Software vol: 5 Iss: 4.
Tjaden et al, "Integrated Network Management for Real-Time Operations," Mar. 1991, pp. 10–15 IEEE Network Magazine.
Borland International Inc. *Turbo C++ Getting Started* 1990 p. 138, Scotts Valley Calif.
Fenlayson et al., "Object-Oriented Communication and Structuring in Vanguard", 17–18 Oct. 1991, pp. 112–113, IEEE Comp. Soc. Press.
Ege, et al. "Design and Implementation of Gordion, an Object Based Systems", 1987, pp. 226–234, IEEE Comput. Soc. Press.
*Microprocessing and Microprogramming*, vol. 24, No. 1–5, Aug. 1988, Amsterdam, "DEOS–A Dynamically Extendible Object-Oriented System", S. T. Krolak et al, pp. 241–248.
*OOPSLA '89, Conference Proceddings, Special Issue of Sigplan Notices*, vol. 24, No. 10, Oct. 1989, "Good News, Bad News: Experience Building a Software Development Environment Using the Ojbect-Oriented Paradigm", W. H. Harrison et al, pp. 85–94.

*Primary Examiner*—Thomas G. Black
*Assistant Examiner*—Jack M. Choules
*Attorney, Agent, or Firm*—Mark S. Walker; L. Keith Stephens

[57] ABSTRACT

A method, system and program for redefining language dependent object definitions as a neutral set of information from which object support for any language, including support between languages, is disclosed. The information is parsed and compiled to generate a bindings file which is input along with method information to the target language compiler to create an object file. The object file is thereafter link edited to create executable programs. Target languages include C, Fortran, C++, COBOL or any other compiled language whether or not the particular language has object programming support. Messages are displayed on a display to aid a user.

3 Claims, 8 Drawing Sheets

SYSTEM FOR PRODUCING LANGUAGE NEUTRAL OBJECTS AND GENERATING AN INTERFACE BETWEEN THE OBJECTS AND MULTIPLE COMPUTER LANGUAGES

This is a continuation of application Ser. No. 07/805,668 filed Dec. 12, 1991 now abandoned. Co-pending applications include U.S. Pat. No. 5,339,438, "Version Independence for Object Oriented Programs", U.S. Pat. No. 5,361,350, "Object Oriented Method Management System and Software For Managing Class Method Names in a Computer System", application Ser. No. 08/299,230, now allowed, which is a continuation of Ser. No. 07/805,777, now abandoned, and Ser. No. 07/805,778 now allowed, all the above applications were filed on the same date as the current application.

FIELD OF THE INVENTION

The invention generally relates to improvements in object oriented applications and more particularly to providing standard interactions between various languages and systems.

BACKGROUND OF THE INVENTION

Among developers of workstation software, object-oriented programming (or OOP) is increasingly recognized as an important new programming technology. It offers expanded opportunities for software reuse and extensibility, with improved programmer productivity when compared to conventional software development paradigms. Even so, object-oriented technology has not effectively penetrated major commercial software products to date. In particular, operating-systems have hesitated to embrace the new technology.

As with many new programming technologies, the early expressions of OOP concepts focused on the creation of new languages and toolkits, each designed to exploit some particular aspect. So-called pure object-oriented languages, such as Smalltalk, presume a complete run-time environment (sometimes known as a virtual machine) because their semantics represent a major departure from traditional procedurally oriented system architectures. Hybrid languages such as C++, on the other hand, require less run-time support but sometimes result in tight bindings between programs that provide objects and the client programs that use them. Tight binding between object-providing programs and their clients often require client programs to be recompiled whenever simple changes are made in the providing programs. Examples of such systems are found in U.S. Pat. No. 4,885,717; 4,953,080 and 4,989,132.

Because different languages and object-oriented toolkits emphasize different aspects of OOP, the utility of the resulting software is frequently limited in scope. A C++ programmer, for example, cannot easily use objects developed in Smalltalk, nor can a Smalltalk programmer make effective use of C++ objects. Objects and classes implemented in one language simply cannot be readily used from another. Unfortunately when this occurs one of the major benefits of OOP, the increased reuse of code, is severely curtailed. Object-oriented language and toolkit boundaries become, in effect, barriers to interoperability.

SUMMARY OF THE INVENTION

Accordingly, it is a primary objective of the present invention to redefine language dependent object definitions as a neutral set of information from which object support for any language, including support between languages, is available.

These and other objectives of the present invention are accomplished by the operation of an algorithm in the memory of a processor. A file containing a language neutral Object Interface Definition Language (OIDL) definition is recovered from a disk or other storage medium and input to a compiler resident in the memory of a computer. The compiler is a tool that converts the OIDL definition file into an intermediate form. The intermediate form is input to an emitter, which is a collection of utility routines that convert the intermediate form of the file into binding that conform with the particular target language. The bindings are input to the particular target language compiler to generate object modules. Finally, object modules are link edited to create a loadable module. The loadable module is available to any application program requiring its unique object functionality.

DETAILED DESCRIPTION OF THE INVENTION

Figure 1:
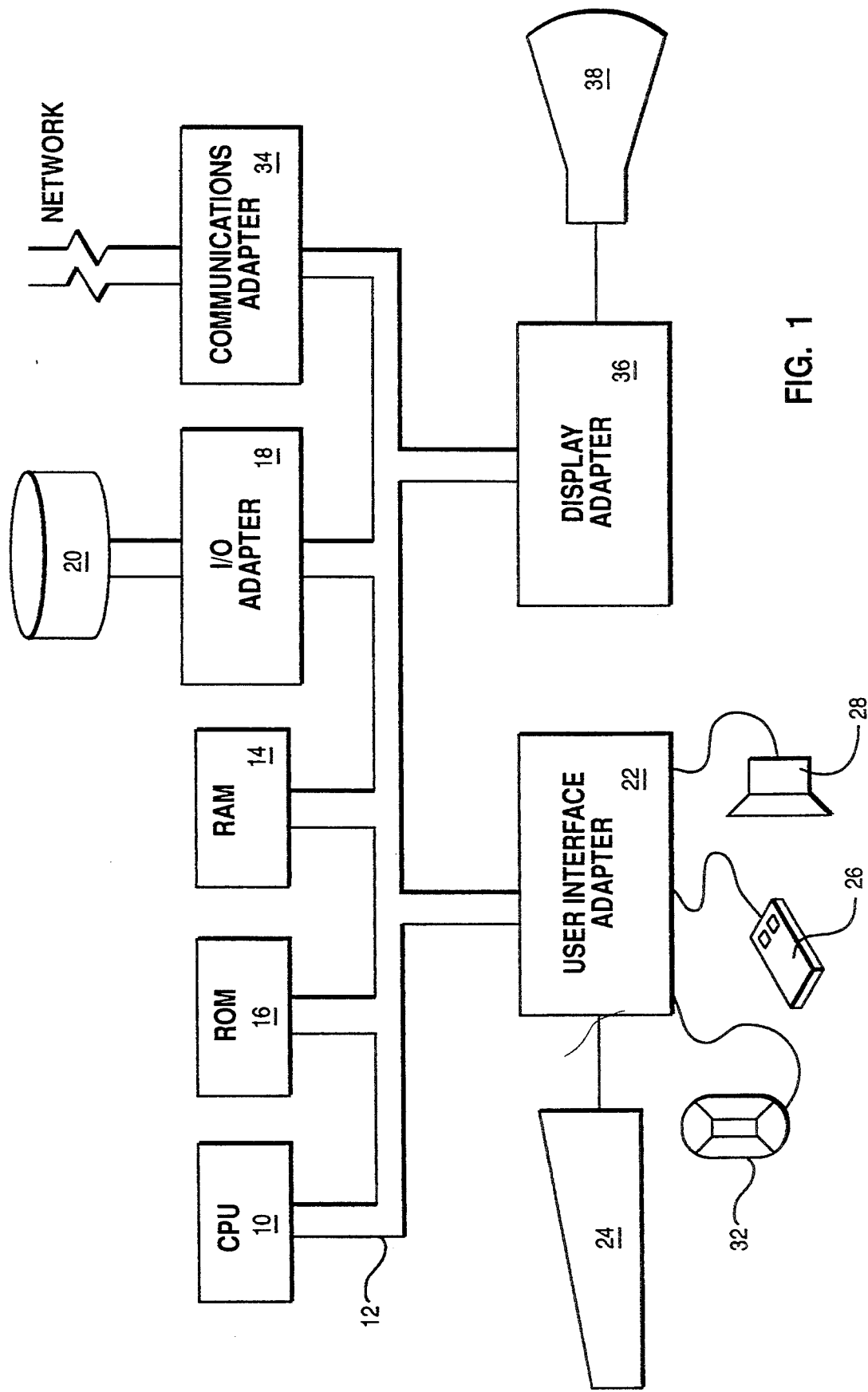
FIG. 1 is a block diagram of a personal computer system in accordance with the subject invention.

The invention is preferably practiced in the context of an operating system resident on an IBM PS/2 computer available from IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Reach Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon the OS/2 base operating system and the computer software making up this invention which is included as a toolkit.

Object-Oriented Programming is quickly establishing itself as an important methodology in developing high quality, reusable code. The invention includes a new system for developing class libraries and Object-Oriented programs. This system is called the System Object Model (SOM). A detailed description of object oriented programming, SOM, and a comparison to other object-oriented languages is provided to aid in understanding the invention.

INTRODUCTION TO OBJECT-ORIENTED PROGRAMMING

A new development in the software community is Object-Oriented Programming. Object-Oriented Programming Languages (OOPL) are being used throughout the industry, Object-Oriented Databases (OODB) are starting widespread interest, even Object-Oriented Design and Analysis (OODA) tools are changing the way people design and model systems.

Object-Oriented Programming is best understood in contrast to its close cousin, Structured Programming. Both attempt to deal with the same basic issue, managing the complexity of ever more complex software systems. Structured Programming models a system as a layered set of functional modules. These modules are built up in a pyramid like fashion, each layer representing a higher level view of the system. Structured Programming models the system's behavior, but gives little guidance to modeling the system's information.

Object-Oriented Programming models a system as a set of cooperating objects. Like Structured Programming, it tries to manage the behavioral complexity of a system. Object-Oriented Programming, however, goes beyond Structured Programming in also trying to manage the informational complexity of a system.

Because Object-Oriented Programming models both the behavioral and informational complexity of a system, the system tends to be much better organized than if it was simply well "structured". Because Object-Oriented systems are better organized, they are easier to understand, debug, maintain, and evolve. Well organized systems also lend themselves to code reuse.

Object-Oriented Programming envisions the dual issues of managing informational and behavioral complexity as being closely related. Its basic unit of organization is the object. Objects have some associated data, which are referred to as an object's state, and a set of operations, which are referred to as an object's methods. A method is implemented by a subroutine. A class is a general description of an object, which defines the data representative of an object's state, and the methods for supporting the object.

OBJECT-ORIENTED PROGRAMMING IN C

Before examining SOM, consider Object-Oriented Programming in C; this will lead us naturally into the SOM philosophy. Consider a data structure definition containing information related to a generic stack. The data structure encompasses a series of functions designed to operate on a stack structure. Given a basic stack definition, multiple instances of this data structure may be declared within our program.

A generic stack definition, in C, appears below:

```
struct stackType {
    void *stackArray[STACK_SIZE];
    int stackTop;
};
typedef struct stackType Stack;
```

A definition of a generic stack function appears next:

```
Stack *create(); /* malloc and initialize a
    new stack. */
void *pop( /* Pop element off stack.
    */
    Stack *thisStack);
void push( /* Push onto stack. */
    Stack *thisStack,
    void *nextElement);
```

Most C programmers can imagine how such functions would be written. The <push()> function, for example, appears below.

```
void push(Stack *thisStack, void *nextElement)
{
    thisStack->stackArray[thisStack->stackTop] =
nextElement;
    thisStack->stackTop++;
}
```

A client program might use this stack to, say, create a stack of words needing interpretation:

```
mains()
{
    Stack *wordStack;
    char *subject = "Emily";
    char *verb = "eats";
    char *object = "ice cream";
    char *nextWord;
    wordStack = create();
    push(wordStack, object);
    push(wordStack, verb);
    push(wordStack, subject);
    /* ... */
    while (nextWord = pop(wordStack)) {
        printf(" %s \n", nextWord);
    }
}
```

This example can be used to review Object-Oriented Programming. A class is a definition of an object. The definition includes the data elements of the object and the methods its supports. A <stack> is an example of a class. A stack contains two data elements (<stackArray> and <stackTop>), and supports three methods, <create()>, <push()>, and <pop()>. A method is like a function, but is designed to operate on an object of a particular class. AN object is a specific instance, or instantiation, of a class. The object <wordStack> is an object of class <Stack>, or <wordStack> is an instance of a stack.

Every method requires a specific object on which it is to operate. This object is called a target object, or sometimes a receiving object. Notice that each method (except <crate()>) takes as its first parameter a pointer to the target object. This is because a program may have many objects of a given class, and each are potential targets for a class method.

There are three important advantages of this type of organization. First, generic concepts are developed which can be reused in other situations in which similar concepts are appropriate. Second, self-contained code is developed, which can be fully tested before it is folded into our program. Third, encapsulated code is developed in which the internal details are hidden and of no interest to the client. A client <main()> program need know nothing about the <Stack> class other than its name, the methods its supports, and the interfaces to these methods.

COMPARISON TO C++

Another beneficial comparison is between SOM and the most widespread Object-Oriented programming language, C++. SOM has many similarities to C++. Both support class definitions, inheritance, and overridden methods (called virtual methods in C++). Both support the notion of encapsulation. But whereas C++ is designed to support stand-along programming efforts, SOM is focused on the support of commercial quality class libraries. Most of the differences between SOM and C++ hinge on this issue. C++ class libraries are version independent. When a new C++ class library is released, client code has to be fully recompiled, even if the changes are unrelated to public interfaces.

C++ supports programming in only one language, C++. SOM is designed to support many languages. Rather than a language, SOM is a system for defining, manipulating, and releasing class libraries. SOM is used to define classes and methods, but it is left up to the implementor to choose a language for implementing methods without having to learn a new language syntax.

C++ provides minimal support for implementation hiding, or encapsulation. C++ class definitions, which must be released to clients, typically include declarations for the private data and methods. In SOM, the client never has to focus on these implementation details. The client need see only the <.sc> files, which contains only public information. C++ also provides a limited method resolution function. SOM offers several alternatives, such as offset method resolution, name lookup resolution, and dispatch resolution.

One other interesting difference between SOM and C++ is in its notion of class. In C++, the class declaration is very similar to a structure declaration. It is a compile-time package with no characteristics that have significance at runtime. In SOM, the class of an object is an object. The class object is itself an instantiation of another class, called the metaclass. The class object supports a host of useful methods which have no direct parallels in C++, such as <somGetName()>, <somGetParent()>, and <somFindMethod()>.

INTRODUCTION TO SOM

OS/2 2.0 includes a language-neutral Object-Oriented programming mechanism called SOM (for System Object Model). Although it is possible to write Object-Oriented programs in traditional languages, such as the stack example, SOM is specifically designed to support the new paradigm and to be used with both procedural (or non Object-Oriented) languages and Object-Oriented languages.

An important requirement of Object-Oriented programming is code reusability. Typically, code reusability is achieved through the use of class libraries. Today's library technology is limited in that class libraries are always language specific. A C++ library cannot be used by a Smalltalk programmer and a Smalltalk programmer cannot utilize a C++library. Clearly it is necessary to create a language-neutral object model, which can be used to create class libraries usable from any programming language, procedural or Object-Oriented.

SOM introduces three important features lacking in most procedural languages. These are encapsulation, inheritance, and polymorphism (referred to here as "override resolution"). Inheritance refers to a technique of specifying the shape and behavior of a class (called a subclass) as incremental differences from another class (called the parent class or superclass).

Encapsulation refers to hiding implementation details from clients. This protects clients from making changes in an implementation which could adversely affect the system. For example, in the stack example there was no protection afforded to the C code. Although clients did not need to know the internal data structures of the stack, there was no way to prevent clients from looking at such implementation details. We could discourage, but not prevent, clients from writing code which used, and possibly corrupted, internal stack data elements.

Inheritance, or class derivation, is a specific technique for developing new classes from existing classes. This capability provides for the creation of new classes which are more specialized versions of exiting classes. For example, we could create a <DebuggableStack>, which is like a <Stack> class, but supports further debugging methods, such as <peak()> for looking at the top value and <dump()> for printing a complete listing of the stack.

Inheritance also provides code consolidation. So, for example, a class defining <GraduateStudent> and <UnderGraduateStudent>, can be consolidate into a third class, <Student>. We then define <GraduateStudent> and <UnderGraduate> as more specialized classes, both derived from the common parent <student>.

Inheritance introduces some additional semantics. A specialized class is said to be derived from a more generalized class. The general class is called the parent class, or sometimes, the base class. The specialized class is called the child class, or sometimes, the derived class. A child class is said to inherit the characteristics of its parent class, meaning that any methods defined for a parent are automatically defined for a child. Thus, because <GraduateStudent> and <UnderGraduateStudent> are both derived from <Student>, they both automatically acquire any methods declared in their common parent.

Override resolution refers to invoked methods being resolved based not only on the name of the method, but also on a class place within a class hierarchy. This allows us to redefine methods as we derive classes. We might define a <printStudentInfo()> method for <Student> and then override, or redefine, the method in both <UnderGraduateStudent>, and <GraduateStudent>. Override resolution resolves based on the type of the target object. If the target object type is a <Student>, the <Student> version of <printStudentInfo()> is invoked. If the target object type is a <GraduateStudent>, the <GraduateStudent> version of <printStudentInfo()> is invoked.

DEFINING CLASSES IN SOM

The process of creating class libraries in SOM is a three step process. The class designer defines the class interface, implements the class methods, and finally loads the resulting object code into a class library. Clients either use these classes directly, make modifications to suit their specific purposes, or add entirely new classes of their own.

In SOM, a class is defined by creating a class definition file. The class definition file is named with an extension of "csc". In its most basic form, the class definition file is divided into the following sections:

1. Include section

This section declares files which need to be included, much like the C <#include> directive.

2. Class name and options

This section defines the name of the class and declares various options.

3. Parent information

This defines the parent, or base, class for this class. All classes must have a parent. If a class is not derived from any existing classes, then it's parent will be the SOM defined class <SOMobject>, the class information of which is in the file <somobj.sc>.

4. Data Section

This section declares any data elements contained by objects of this class. By default, data can be accessed only by methods of the class.

5. Methods Section

This section declares methods to which objects of this class can respond. By default, all methods declared in this section are available to any class client. The class definition file, <student.csc>, describes a non-derived <Student> class, and is set forth below.

```
Class Definition File: <student.csc>
include <somobj.sc>
class:
    Student;
parent:
    SOMObject;
data:
    char id[16]; /* student id */
    char name[32]; /* student name */
methods:
    void setUpStudent(char *id, char *name);
    -- sets up a new student.
    void printStudentInfo();
    -- prints the student information.
    char *getStudentType();
    -- returns the student type.
    char *getStudentId();
    -- returns the student id.
```

How to Write a Method

Class methods are implemented in the class method implementation file. Each method defined in the method section of the class definition file needs to be implemented. They can be implemented in any language that offers SOM support. C is used for an exemplary language throughout the specification. However, one of ordinary skill in the art will realize that any programming language can be substituted. The student class method implementation file, <student.c>, is set forth below.

```
Class Method Implementation File: <student.c>
#define Student_Class_Source
#include "student.ih"
static void setUpStudent(
    student *somSelf, char *id, char *name)
{
    StudentData *somThis =
    StudentGetData(somSelf);
    strcpy(_id, id);
    strcpy(_name, name);
}
static void printStudentInfo(Student *somSelf)
{
    StudentData *somThis =
    StudentGetData(somSelf);
    printf("Id : % s \ n", _id);
    printf("Name : % s \ n", _name);
    printf("Type : % s \ n",
    _getStudentType(somSelf));
}
static char *getStudentType(Student *somSelf)
{
    StudentData *somThis =
    StudentGetData(somSelf);
    static char *type = "student";
    return (type);
}
static char *getStudentId(Student *somSelf)
{
    StudentData *somThis =
    studentGetData(somSelf);
    return (_id);
}
```

Notice that the method code appears similar to standard C. First, each method takes, as its first parameter, a pointer (<somSelf>) to the target object. This parameter is implicit in the class definition file, but is made explicit in the method implementation. Second, each method starts with a line setting an internal variable named <somThis>, which is used by macros defined within the SOM header file. Third, names of data elements of the target object are preceded by an underscore character "_". The underscored name represents a C language macro defined in the class header file. Fourth, methods are invoked by placing an underscore "_" in front of the method name. This underscored name represents a macro for message resolution and shields a programmer from having to understand the details of this process.

The first parameter of every method is always a pointer to the target object. This is illustrated below in the method <printStudentInfo()> which invokes the method -continued
```
<getStudentType()> on its target object.
SOM compiler generated <student.c>
#define Student_Class_Source
#include "student.ih"
static void setUpStudent(
    Student *somSelf, char *id, char *name)
{
    StudentData *somThis =
    StudentGetData(somSelf);
}
static void printStudentInfo(Student *somSelf)
{
    StudentData *someThis =
    StudentGetData(somSelf);
}
/* ... and so on for the other methods. */
```

MECHANICS OF USING SOM

There are a set of files involved with each class which are discussed below. The files have different extensions, but all have the same filename as the class definition file, <Student> in our example. These files are described below.

Student Class Files

<student.csc>—This is the class definition file, as described earlier.

<student.sc>—This is a subset of the class definition file. It includes all information from the <.csc> file which is public, including comments on public elements. For the student example, <student.sc> would include everything from <student.csc> except the data section. This file is created by the SOM compiler.

<student.h>—This is a valid C header file which contains macros necessary to invoke public methods and access public data elements of the class. This file will be included in any client of the class, and is created by the SOM compiler.

<student.ih>—Similar to <student.h>, but it contains additional information needed for implementing methods. This is the implementor's version of the <.h> file, and must be included in the class methods implementation file. This file is created by the SOM compiler and should not be edited.

<student.>—Contains the method implementations. Initially created by the SOM compiler and then updated by the class implementor.

BUILDING SOM CLASSES FROM OTHER CLASSES

There are two ways to use classes as building blocks for other classes. These are derivation (or inheritance) and construction.

DERIVATION

In this example, <GraduateStudent> is derived from <Student>, its base, or parent class. A derived class automatically picks up all of the characteristics of the base class. A derived class can add new functionality through the definition and implementation of new methods. A derived class can also redefine methods of its base class, a process called overriding. For example <GraduateStudent> adds <setUpGraduateStudent()> to those methods it inherits from >Student>. It overrides two other inherited methods, <printStudentInfo()> and <getStudentType()>. It inherits without change <setUpStudent()> and <getStudentId()> from the <Student> base class.

The class definition file for <GraduateStudent>, <graduate.csc>, is set forth below.

```
Class Definition File: <graduate.csc>
include <student.sc>
class:
    GraduateStudent;
parent:
    Student;
data:
    char thesis[128]; /* thesis title */
    char degree[16]; /* graduate degree type
*/
methods:
    override printStudentInfo;
    override getStudentType;
    void setUpGraduateStudent(
        char *id, char *name, char *thesis, char
        *degree);
```

The method implementation file, <graduate.c>, is shown below.

```
Class Method Implementation File: <graduate.c>
#define GraduateStudent _Class_source
#include "graduate.ih"
static void printStudentInfo(GraduateStudent
*somSelf)
{
    GraduateStudentData *someThis =
    GraduateStudentGetData(somSelf);
    parent_printStudentInfo(somSelf);
    printf(" Thesis : %.s \ n", _thesis);
    printf(" Degree : % s \ n", _degree);
}
static char *getStudentType(GraduateStudent
*somSelf)
{
    static char *type = "Graduate";
    return (type);
}
static void setUpGraduateStudent(
    GraduateStudent *somSelf, char *id, char
    *name,
    char *thesis, char *degree)
{
    GraduateStudentData *someThis =
    GraduateStudentGetData(somSelf);
    _setUpStudent(somSelf,id,name);
    strcpy(_thesis, thesis);
    strcpy(_degree, degree);
}
```

Often an overridden method will need to invoke the original method of its parent. For example, the <printStudentInfo()> for <GraduateStudent> first invokes the <Student> version of <printStudentInfo()> before printing out the <GraduateStudent> specific information. The syntax for this is "<parent_MethodName>", as can be seen in the <printStudentInfo()> method.

A given base class can be used for more than one derivation. The class, <UnderGraduateStudent>, is also derived from <Student>. The class definition file, <undgrad.csc>, is set forth below.

```
Class Definition File: <undgrad.csc>
include <student.sc>
class:
    UnderGraduateStudent;
parent:
    Student;
data:
```

```
            char date[16];  /* graduation date */
        methods:
            override printStudentInfo;
            override getStudentType;
            void setUpUnderGraduateStudent(
                char *id, char *name, char *date);
```

The method implementation file, <undgrad.c>, is set forth below.

```
        Class Method Implementation File: <undgrad.c>
        #define UnderGraduateStudent__Class__Source
        #include "undgrad.ih"
        static void printStudentInfo
            UnderGraduateStudent *somSelf)
        {
            UnderGraduateStudentData *someThis =
                UnderGraduateStudentGetData(somSelf);
            parent_printStudentInfo(somSelf);
            printf(" Grad Date : %s \ n", __date);
        }
        static char *getStudentType(UnderGraduateStudent
            *somSelf)
        {
            static char *type = "UnderGraduate";
            return (type);
        }
        static void setUpUnderGraduateStudent(
            UnderGraduateStudent *somSelf,char *id, char
        *name, char *date)
        {
            UnderGraduateStudentData *someThis =
                UnderGraduateStudentGetData(somSelf);
            __setupStudent(somSelf,id,name);
            strcpy(__date, date);
        }
```

The second technique for building classes is construction. Construction refers to a class using another class, but not through inheritance. A good example of construction is the class <Course> which includes an array of pointers to <Student>s. Each pointer contains the address of a particular student taking the course. <Course> is constructed from <Student>. The class definition file for <Course>, <course.csc>, is shown below.

```
        Class Definition File: <course.csc>
        include <somobj.sc>
        class:
            Course;
        parent:
            SOMObject;
        data:
            char code[8];  /* course code
                number */
            char title[32];  /* course title */
            char instructor[32];  /* instructor
                teaching */
            int credit;  /* number of credits
                */
            int capacity;  /* maximum number of
                seats */
            Student __studentList[20];  /* enrolled student
            int enrollment;  /* number of
                enrolled students */
        methods:
            override somInit;
            void setUpCourse(char *code, char *title,
                char *instructor, int credit, int capacity);
            -- sets up a new course.
            int addStudent(Student *student);
            -- enrolls a student to the course.
            void dropStudent(char *studentId);
            -- drops the student from the course.
```

```
            void printCourseInfo();
            -- prints course information.
```

Often classes will want to take special steps to initialize their instance data. An instance of <Course> must at least initialize the <enrollment> data element, to ensure the array index starts in a valid state. The method <somInit()> is always called when a new object is created. This method is inherited from <SOMObject>, and can be overridden when object initialization is desired.

This example brings up an interesting characteristic of inheritance, the "is-a" relationship between derived and base classes. Any derived class can be considered as a base class. We say that a derived class "is-a" base class. In the previous example, any <GraduateStudent> "is-a" <Student>, and can be used anyplace we are expecting a <Student>. The converse is not true. A base class is not a derived class. A <Student> can not be treated unconditionally as a <GraduateStudent>. Thus, elements of the array <studentList> can point to either <Student>s, a <GraduateStudent>s, or a <UnderGraduateStudent>s.

The method implementation file for <Course>, <course.c>, is set forth below.

```
        Class Method Implementation File: <course.c>
        #define Course__Class__Source
        #include <student.h>
        #include "course.ih"
        static void somInit(course. *somSelf)
        {
            CourseData *someThis = CourseGetoata(somSelf);
            parent_somInit(somSelf);
            __code[0] = __title[0] = __instructor[0] = 0;
            __credit = __capacity = __enrollment = 0;
        }
        static void setUpCourse(Course *somSelf, char
        *code,
            char *title, char *instructor, int credit,
        int capacity)
        {
            CourseData *someThis = CourseGetData(somSelf);
            strcpy(__code, code);
            strcpy(__title, title);
            strcpy(__instructor, instructor);
            __credit = credit;
            __capacity = capacity;
        }
        static int addStudent(Course *somSelf, Student
        *student)
        {
            Coursedata *someThis = CourseGetData(somSelf);
            if(__enrollment >= __capacity) return(-1);
            __studentListl[__enrollment++] = student;
            return(0);
        }
        static void dropStudent(Course *somSelf, char
        *studentId)
        {
            int i;
            CourseData *someThis = CourseGetData(somSelf);
            for(i=0; i<__enrollment; i++)
                if(!strcmp(studentId,
        __getStudentId(__studentList[i]))) {
                    __enrollment--;
                    for(i; i<__enrollment; i++)
                    __studentList[i] = __studentList[i+1];
                    return;
                }
        }
        static void printCourseInfo(Course *somSelf)
        {
            int i;
            CourseData *somThis = CourseGetData(somSelf);
```

```
        printf(" %s %s \n", __code, __title);
        printf(" Instructor Name : %s \n",
            __instructor);
        printf(" Credit = %d, Capacity = %d,
        Enrollment = %d \n \n",
            __credit, __capaoity, __enrollment);
        printf(" STUDENT LIST: \n \n");
        for(i=0; i<__enrollment; i++) {
            __printStudentInfo(__studentList[i]);
            printf(" \n");
        }
    }
```

Notice in particular the method <printCourseInfo()>. This method goes through the array <studentList> invoking the method <printStudentInfo()> on each student. This method is defined for <Student>, and then overridden by both <GraduateStudent> and <UnderGraduateStudent>. Since the array element can point to any to these three classes, it is impossible at compile time to determine what the actual type of the target object is, only that the target object is either a <Student> or some type derived from <Student>. Since each of these classes defines a different <printStudentInfo()> method, it is impossible to determine which of these methods will be invoked with each pass of the loop. This is all under the control of override resolution.

THE SOM CLIENT

To understand how a client might make use of these four classes in a program, an example is presented below in the file <main.c>. The example illustrates object instantiation and creation in SOM, and how methods are invoked.

```
SOM client code: <main.c>
*include <student.h>
#include <course.h>
#include <graduate.h>
#include <undgrad.h>
main()
{
    Course *course = CourseNew();
    GraduateStudent *jane = GraduateStudentNew();
    UnderGraduateStudent *mark =
        UnderGraduateStudentNew();
    __setUpCourse(course, "303", "Compilers ",
        "Dr. David Johnson", 3, 15);
    __setUpGraduateStudent(jane,"423538","Jane
        Brown",
        "Code Optimization", "Ph.D.";
    __setUpUnderGraduateStudent(mark,"399542",
        "Mark Smith", "12/17/92");
    __addStudent(course, jane);
    __addstudent(course, mark);
    __printCourseInfo(course);
}
```

A class is instatiated with the method <classNameNew()>, which is automatically defined by SOM for each recognized class. Methods are invoked by placing an underscore "__" in front of the method name. The first parameter is the target object. The remaining parameters illuminate additional information required by the method. When run, the client program gives the output shown below.

```
              Client Program output
                  303 Compilers
         Instructor Name : Dr. David Johnson
         Credit = 3, Capacity = 15, Enrollment = 2
                   STUDENT LIST:
    Id                    : 423538
    Name                  : Jane Brown
    Type                  : Graduate
    Thesis                : Code Optimization
    Degree                : Ph.D.
    Id                    : 399542
    Name                  : Mark Smith
    Type                  : UnderGraduate
    Grad Date             : 12/17/92
```

The client program output illustrates the override resolution at work in the different styles of displaying <UnderGraduate>s and <GraduateStudent>s. A <Course> thinks of itself as containing an array of <Student>s, and knows that any <Student> responds to a <printStudentInfo()> method. But the <printStudentInfo()> method that an <UnderGraduate> responds to is different than the <printStudentInfo()> method that a <GraduateStudent> responds to, and the two methods give different outputs.

SOM Object Model

Figure 2:
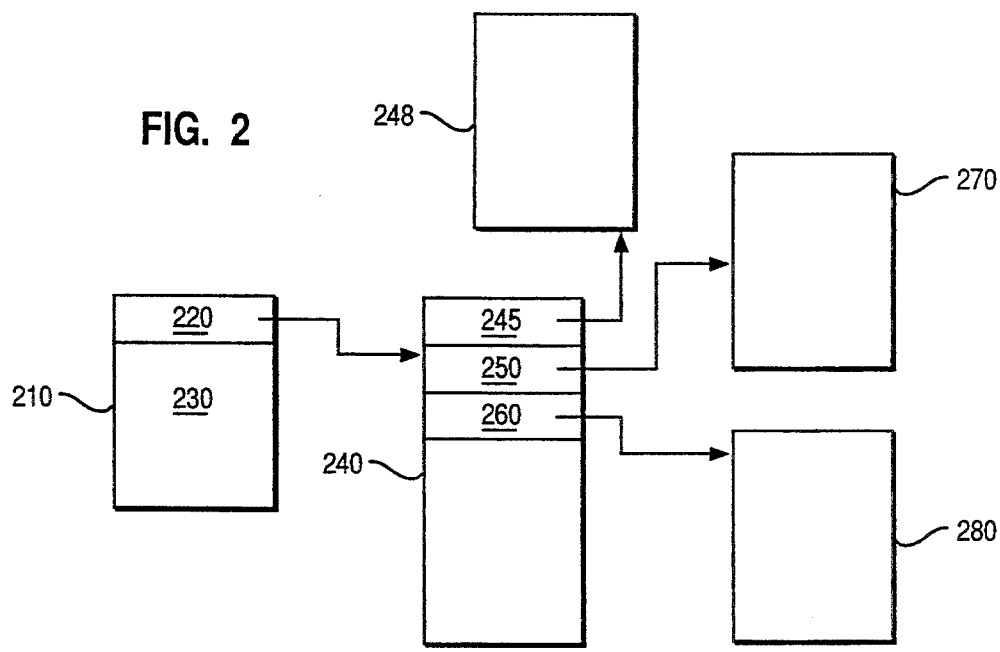
FIG. 2 is a drawing of a SOM data structure in accordance with the subject invention.

FIG. 2 is a drawing of a basic SOM data structure in accordance with the subject invention. Label 210 is a state data structure for a particular object. The first full word at label 220 contains the address of the object's method procedure table label 240. The rest of the state data structure set forth at label 230 contains additional information pertaining to the object. The method procedure table set forth at label 240 contains the address of the class object data structure 245 and addresses of various methods for the particular object 250 and 260. The address at 245 points to the class object data structure 248. All objects that are of the same class as this object also contain an address that points to this method procedure table diagrammed at label 240. Any methods inherited by the objects will have their method procedure addresses at the same offset in memory as they appear in the method procedure table as set forth at label 240 of the ancestor class from which it is inherited.

Address of the blocks of computer memory containing the series of instructions for two of the method procedures are set forth at labels 250 and 260. Labels 270 and 280 represent locations in a computer memory containing the series of instructions of particular method procedures pointed to by the addresses represented by labels 250 and 260.

The SOM Base Classes

Much of the SOM Object Model is implemented by three classes that are part of the basic SOM support. Briefly these classes are:

SOMobject—This class is the root class of all SOM classes. Any class must be descended from SOMObject. Because all classes are descended from SOMObject they all inherit and therefore support the methods defined by SOMObject. The methods of SOMObject like the methods of any SOM class can be overridden by the classes descended from SOMObject.

SOMClass—This class is the root meta class for all SOM meta classes. A meta class is a class whose instances are class objects. SOMClass provides the methods that allow new class objects to be created.

SOMClassMgr—This class is used to create the single object in a SOM based program that manages class objects.

The three SOM base classes are defined below.

SOMObject

This is the SOM root class, all SOM classes must be descended from <SOMObject>. <SOMObject> has no instance data so there is no per-instance cost to being descended from it.

SOMObject has the following methods:
Method: somInit
Parameters: somSelf
Returns: void
Description:

Initialize <self>. As instances of <SOMObject> do not have any instance data there is nothing to initialize and you need not call this method. It is provided to induce consistency among subclasses that require initialization.

<somInit> is called automatically as a side effect of object creation (ie, by <somNew>). If this effect is not desired, you can supply your own version of <somNew> (in a user-written metaclass) which does not invoke <somInit>.

When overriding this method you should always call the parent class version of this method BEFORE doing your own initialization.

Method: somUninit
Parameters: somSelf
Returns: void
Description:

(Un-initialize self) As instances of <SOMObject> do not have any instance data there is nothing to un-initialize and you need not call this method. It is provided to induce consistency among subclasses that require un-initialization.

Use this method to clean up anything necessary such as dynamically allocated storage. However this method does not release the actual storage assigned to the object instance. This method is provided as a complement to <somFree> which also releases the storage associated with a dynamically allocated object. Usually you would just call <somFree> which will always call <somUninit>. However, in cases where <somRenew> (see the definition of <SOMClass>) was used to create an object instance, <somFree> cannot be called and you must call <somUninit> explicitly.

When overriding this method you should always call the parentclass version of this method AFTER doing your own un-initialization.

Method: somFree
Parameters: somSelf
Returns: void
Description:

Releases the storage associated with <self>, assuming that <self> was created by <somNew> (or another class method that used <somNew>). No future references should be made to <self>. Will call <somUninit> or <self> before releasing the storage.

This method must only be called on objects created by <somNew> (see the definition of <somClass>) and never on objects created by <somRenew>.

It should not be necessary to override this method. (Override <someUnit> instead.)

Method: somGetClassName
Parameters: somSelf
Returns: Zstring
Description:

Returns a pointer to this object's class's name, as a NULL terminated string. It should not be necessary to override this method as it just invokes the class object's method (<someGetName>) to get the name.

Method: someGetClass
Parameters: somSelf
Returns: SOMClass *
Description:

Returns this object's class object.

Method: somGetSize
Parameters: somSelf
Returns: integer4
Description:

Returns the size of this instance in bytes.

Method: somRespondsTo
Parameters: somSelf, somId Mid
Returns: Int
Description:

Returns 1 (true) if the indicated method is supported by this object's class and 0 (false) otherwise.

Method: somIsA
Parameters: somSelf, SOMClass *Aclassobj
Returns: int
Description:

Returns 1 (true) it <self>'s class is a descendent class of <Aclassobj> and 0 (false) otherwise. Note: a class object is considered to be descended from itself for the purposes of this method.

Method: somIsInstanceOf
Parameters: somSelf, SOMClass *Aclassobj
Returns: int
Description:

Returns 1 (true) if <self> is an instance of the specified <Aclassobj> and 0 (false) otherwise.

SOMObject methods that support dynamic object models. These methods make it easier for very dynamic domains to bind to the SOM object protocol boundary. These methods determine the appropriate method procedure and then call it with the argument specified. The default implementation of these methods provided in this class simply lookup the method by name and call it. However, other classes may choose to implement any form of lookup they wish. For example, one could provide an implementation of these methods that used the CLOS form of method resolution. For domains that can do so it will generally be much faster to invoke their methods directly rather than going through a dispatch method. However, all methods are reachable through the dispatch methods. SOM provides a small set of external procedures that wrap these method cells so that the caller need never do method resolution.

These methods are declared to take a variable length argument list, but like all such methods the SOM object protocol boundary requires that the variable part of the argument list be assembled into the standard, platform-specific, data structure for variable argument lists before the method is actually invoked. This can be very useful in domains that need to construct the argument list at runtime. As they can invoke methods without being able to put the constructed arguments in the normal form for a call. This is helpful because such an operation is usually impossible in most high lever languages and platform-specific assembler language routines would have to be used.

Note: different methods are defined for different return value shapes. This avoids the memory management problems that would arise in some domains if an additional parameter was required to carry the return value. SOM does not support return values except for the four families shown below. Within a family (such as integer) SOM only supports the largest member.

Method: somDispatchV
Parameters: somSelf, somId methodId, somID descriptor, . .
Returns: void
Description:
 Does not return a value.

Method: somDispatchL
Parameters: somSelf, somId methodId, somId descriptor
Returns: integer4
Description:
 Returns a 4 byte quantity in the normal manner that integer data is returned. This 4 byte quantity can, of course, be something other than an integer.

Method: somDispatchA
Parameters: somSelf, somId methodId, somId descriptor
Returns: void *
Description:
 Returns a data structure address in the normal manner that such data is returned.

Method: somDispatchD
Parameters: somSelf, somId methodId, somId descriptor
Returns: float8
Description:
 Returns a 8 byte quantity in the normal manner that floating point data is returned.

SOMObject methods that support development

The methods in this group are provided to support program development. They have been defined in such a way that most development contexts will find them easy to exploit. However, some contexts may need to customize their I/O facilities. We have attempted to allow this customization in a very portable manner, however not all contexts will be able to perform the customization operations directly because they require passing function parameters. We chose this approach because it allows great platform-neutral flexibility and we felt that any provider of development support would find it reasonable to provide the customizations necessary for her/his specific development environment.

The chosen approach relies on a character output routine. An external variable, <SOMOutCharRoutine>, points to this routine. The SOM environment provides an implementation of this routine that should work in most development environments (it writes to the standard output stream). A development context can, however, assign a new value to <SOMOutCharRoutine> and thereby redefine the output process. SOM provides no special support for doing this assignment.

Method: somPrintSelf
Parameters: somSelf
Returns: SOMAny *
Description:
 Uses <SOMOutCharRoutine> to write a brief string with identifying information about this object. The default implementation just gives the object's class name and its address in memory. <self> is returned.

Method: somDumpSelf
Parameters: somSelf, int level
Returns: void
Description:
 Uses <SOMOutCharRoutine> to write a detailed description of this object and its current state. <level> indicates the nesting level for describing compound objects it must be greater than or equal to zero. All lines in the description will be preceded by <2*level> spaces.
 This routine only actually writes the data that concerns the object as a whole, such as class, and uses <somDumpSelfInt> to describe the object's current state. This approach allows readable description of compound objects to be constructed.
 Generally it is not necessary to override this method, if it is overridden it generally must be completely replaced.

Method: somDumpSelfInt
Parameters: somSelf, int level
Returns: void
Description:
 Uses <SOMOutCharRoutine> to write out the current state of this object. Generally this method will need to be overridden. When overriding it, begin by calling the parent class form of this method and then write out a description of your class's instance data. This will result in a description of all the object's instance data going from its rood ancestor class to its specific class.

SOMClass

This is the SOM metaclass. That is, the instances of this class are class objects. When the SOM environment is created one instance of this class with the external name <SOMClassClassData.classObject> is created. This class object is unique because it is its own class object. That is, SOMClassClassData.classObject==1.3someGetClass(SOMClassClassData.classObject). This class introduces the someNew and someRenew methods that are used to create new instances of SOM objects. somNew applied to <SOMClassClassData.classObject> produces a new class object which can then be initialized to become a particular new class. SOMClass can be subclassed just like any SOM class. The subclasses of SOMClass are new metaclasses and can generate class objects with different implementations than those produced by <SOMClassClassData.classObject>.

SOMClass is descended from SOMobject.
SOMClass defines the following methods.

Method: someNew
Parameters: somSelf
Returns: SOMAny *
Description:
 Make an instance of this class. When applied to <SOMClassClassData.classObject>, or any other metaclass object, this will produce a new class object; when applied to a regular class object this will produce an instance of that class.

Method: somRenew
Parameters: somSelf, SOMAny *obj
Returns: SOMAny *
Description:
 Make an instance of this class, but use the space pointed to by <obj> rather than allocating new space for the object. Note: no test is made to insure that <obj> points to enough space. <obj> is returned, but it is now a pointer to a valid, initialized, object.

Method: somInitClass
Parameters: somSelf, Zstring className, SOMAny *parentClass, integer4 instanceSize, int maxStaticMethods, integer4 majorVersion, integer4 minorVersion
Returns: void
Description:
Initialize <self>.

<parentClass> is the parent (or parent class) of this class, it may be NULL in which case it default to SOMObject (actually SOMObjectClassData.classObject the class object for SOMObject). If a parent class is specified then it must have already been created as a pointer to its class object is required.

<instanceSize> should be just the space needed for this class, it is not necessary to consider the parent class's (if any) space requirements.

<maxStaticMethods> should be just the static methods defined by this class, it is not necessary to consider the parent class's methods (if any), even if they are overridden in this class.

<majorVersion> indicates the major version number for this implementation of the class definition, and <minorVersion> indicates the minor version number.
Method: somClassReady
Parameters: somSelf
Returns: void
Description:
This method is invoked when all of the static initialization for the class has been finished. The default implementation simply registers the newly constructed class with the SOMClassMgr. Metaclasses may override this method to augment the class construction sequence in any way that they wish.
Method: someGetName
Parameters: somSelf
Returns: Zstring
Description:
Returns this object's class name as a NULL terminated string.
Method: somGetParent
Parameters: somSelf
Returns: SOMclass *
Description:
Returns the parent class of self if one exists and NULL otherwise.
Method: somGetClassData
Parameters: somSelf
Returns: somClassDataStructure *
Description:
Returns a pointer to the static <className>ClassData structure.
Method: somSetClassData
Parameters: somSelf, somClassDataStruture *cds
Returns: void
Description:
Sets the class' pointer to the static <className>ClassData structure.
Method: somDescendedFrom
Parameters: somSelf, SOMClass *Aclassobj
Returns: int
Description:
Returns 1 (true) if <self> is a descendent class of <Aclassobj> and 0 (false) otherwise. Note: a class object is considered to be descended itself for the purposes of this method.
Method: somCheckVersion
Parameters: somSelf, integer4 majorVersion, integer4 minorVersion
Returns: int
Description:
Returns 1 (true) if the implementation of this class is compatible with the specified major and minor version number and false (0) otherwise. An implementation is compatible with the specified version numbers if it has the same major version number and a minor version number that is equal to or greater than <minorVersion>. The major, minor version number pair (0,0) is considered to match any version. This method is usually called immediately after creating the class object to verify that a dynamically loaded class definition is compatible with a using application.
Method: somFindMethod
Parameters: somSelf, somId methodId, somMethodProc **m
Returns: int
Description:
Finds the method procedure associated with <methodID> for this class and sets <m> to it. 1 (true) is returned when the method procedure is directly callable and 0 (false) is returned when the method procedure is a dispatch function.

If the class does not support the specified method then <m> is set to NULL and the return value is meaningless.

Returning a dispatch function does not guarantee that a class supports the specified method; the dispatch may fail.
Method: somFindMethodOk
Parameters: somSelf, somId methodId, SomMethodProc **m
Returns: int
Description:
Just like <somFindMethod> except that if the method is not supported then an error is raised and execution is halted.
Method: somFindSMethod
Parameters: somSelf, somId methodId
Returns: somMethodProc *
Description:
Finds the indicated method, which must be a static method defined for this class, and returns a pointer to its method procedure. If the method is not defined (as a static method or at all) for this class then a NULL pointer is returned.
Method: somFindSMethodOk
Parameters: SomSelf, somId methodId
Returns: somMethodProc *
Description:
Just like <somFindSMethod> except that an error is raised if the method is not defined for this class.
Method: somSupportsMethod
Parameters: somSelf, somId Mid
Returns: int
Description:
Returns 1 (true) if the indicated method is supported by this class and 0 (false) otherwise.
Method: somGetNumMethods
Parameters: somSelf
Returns: int
Description:
Returns the number of methods currently supported by this class, including inherited methods (both static and dynamic).
Method: somGetInstanceSize Parameters: somSelf
Returns: integer4
Description:
Returns the total size of an instance of <self>. All instances of <self> have the same size.
Method: somGetInstanceOffset
Parameters: somSelf
Returns: integer4
Description:
Return the offset in the body part of this object for the instance data belonging to this class.
Method: somGetInstancePartSize
Parameters: somSelf
Returns: integer4
Description:
Returns the size in bytes of the instance data required for this class. This does not include the instance data space required for this class' ancestor or descendent classes.
Method: somGetNumStaticMethods
Parameters: somSelf
Returns: int
Description:
Returns the number of static methods that this class has. This is used by a child class in initializing its method table.
Method: somGetPClsMtab
Parameters: somSelf
Returns: somMethodTab *
Description:
Returns a pointer to the method table of this class's parent class. If this class is a root class (SOMObject) then NULL is returned.
Method: somGetClassMtabe
Parameters: somSelf
Returns: somMethodTab *
Description:
Returns a pointer to the method table of this class.
Method: somAddStaticMethod
Parameters: somSelf, somId methodId, somId methodDescriptor, somMethodProc *method, somMethodProc *redispatchStud, somMethodProc *applyStub
Returns: somMoffset
Description:
Adds/overrides the indicated method, returns the value that should be used to set the offset value in the class data structure for this method name.

<methodDescriptor> is a somId for a string describing the calling sequence to this method as described in <someGetNthMethodInfo> defined in the SOMObject class definition.

<method> is the actual method procedure for this method.

<redispatchStub> is a procedure with the same calling sequence as <method> that re-dispatches the method to one of this class's dispatch functions.

<applyStub> is a procedure that takes a standard variable argument list data structure applies it to its target object by calling <method> with arguments derived from the data structure. Its calling sequence is the same as the calling sequence of the dispatch methods defined in SOMObject. This stub is used in the support of the dispatch methods used in some classes. In classes where the dispatch functions do not need such a function this parameter may be null.
Method: somOverrideSMethod
Parameters: somSelf, somId methodId, somMethodProc *method
Returns: void
Description:
This method can be used instead of <somAddStaticMethod> or <somAddDynamicMethod> when it is known that the class' parent class already supports this method. This call does not require the method descriptor and stub methods that the others do.
Method: somGetMethodOffset
Parameters: somSElf, somId methodId
Returns: integer4
Description:
Returns the specified method's offset in the method procedure table assuming this is a static method, return 0 if it was not. This value is used to set the offset value in this class data structure. It should only be necessary to use this method when a class used to define a method that it now inherits.
Method: somGetApplyStub
Parameters: somSelf, somId methodId
Returns: somMethodProc *
Description:
Returns the apply stub associated with the specified method. NULL is returned if the method is not supported by this class. An apply stub is a procedure that is called with a fixed calling sequence, namely (SOMAny *self, somId methodId, somId descriptor, ap_list ap) where <ap> is a varargs data structure that contains the actual argument list to be passed to the method. The apply stud forwards the call to tis associated method and then returns any result produced by the method.

SOMClassMgr

SOMClassMgr is descended from SOMObject
SOMObject defines the following methods:
Method: somFindClsInFile
Parameters: somSElf, somId classId, int majorVersion, int minorVersion, Zstring file
Returns: SOMClass *
Description:
Returns the class object for the specified class. This may result in dynamic loading. If the class already exists <file> is ignored, otherwise it is used to locate and dynamically load the class. Values of 0 for major and minor version numbers bypass version checking.
Method: somFindClass
Parameters: somSelf, somId classId, int majorVersion, int minorVersion
Returns: SOMClass *
Description:
Returns the class object for the specified class. This may result in dynamic loading. Uses somLocateClassFile to obtain the name of the file where the class' code residues, then uses somFindClsInFile.
Method: somClassFromId
Parameters: somSelf, somId classId
Returns: SOMClass *
Description:
Finds the class object, given its Id, if it already exists. Does not load the class. Returns NULL if the class object does not yet exist.
Method: somRegisterClass
Parameters: somSelf, SOMClass *classObj
Returns: void
Description:
Lets the class manager know that the specified class is installed and tells it where the class object is.
Method: somUnregisterClass
Parameters: somSelf, SOMClass *classObj Returns: int
Description:
Unloads the class file and removes the class from the SOM registry
Method: somLocateClassFile
Parameters: somSelf, somId classId, int majorVersion, int minorVersion
Returns: Zstring
Description:
Real implementation supplied by subclasses. Default implementation returns the class name as the file name. Subclasses may use version number info to assist in deriving the file name.
Method: somLoadClassFile
Parameters: somSelf, somId classId, int majorVersion, int minorVersion, Zstring file
Returns: SOMClass *
Description:
Loads the class' code and initialize the class object.
Method: somUnloadClassFile
Parameters: somSelf, SOMClass *classObj
Returns: int
Description:
Releases the class' code and destroys the class object.
Method: somGetInitFunction
Parameters: somSelf
Returns: Zstring
Description:
Supplies the name of the initialization function in the class' code file. Default implementation returns (*SOM-ClassInitFuncName)().
Method: somMergeInto
Parameters: somSef, SOMObject *targetObj
Returns: void
Description:
Merges the SOMClassMgr registry information from the receiver to <targetObj>. <targetObj> is required to be an instance of SOMClassMgr or one of its subclasses. At the completion of this operation, the <targetObj> should be able to function as a replacement for the receiver. At the end of the operation the receiver object (which is then in a newly uninitialized state) is freed. Subclasses that override this method should similarly transfer their sections of the object and pass this method to their parent as the final step. If the receiving object is the distinguished instance pointed to from the global variable SOMClassMgrObject, SOMClassMgrObject is then reassigned to point to <targetObj>.

Managing Object Names

The subject invention improves upon past object oriented techniques of requiring unique external names for every method for a class by initializing the class method table at runtime via a special procedure associated with each class implementation and by collecting the set of method offsets into a single externally named class data structure. This improvement reduces the complexities of managing a large list of external variables, reduces the problem of creating unique names (referred to as name mangling), reduces the memory requirements and reduces the load time of the generated execution module.

Figure 3:
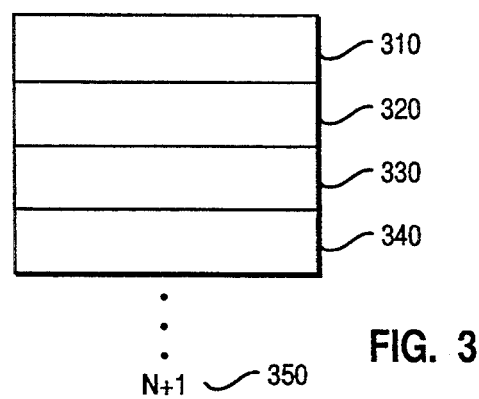
FIG. 3 is a drawing of a SOM class data structure in accordance with the subject invention.

FIG. 3 is a SOM class data structure in accordance with the subject invention. Label 310 represents a pointer to the class object data structure set forth in FIG. 2 at 248. Label 320 represents an offset into the method procedure table set forth in FIG. 2 at label 240 or into the object's state data structure set forth in FIG. 2 at label 230. Similarly, labels 330 and 340 represent additional offsets into the method procedure table or into its state data structure. For additional methods that are first defined in this first class or methods that are mentioned in the class release order section but defined by one of the class' ancestor classes, or public instance variables defined by this class, there are similar entries in the class data structure representing offsets associated with this class as signified by the elipse and "N+1" at label 350. The additional entry is necessary because of the first entry represents a pointer to the class object data structure 248 in FIG. 2.

The order of the values in the class data structure is determined by the order of the corresponding method or public instance variable name in the release order section of the class OIDL file. Method or public data members defined in the class but not mentioned in the release order section are ordered after those mentioned in the release order section and in the order in which they appear in the class OIDL file.

Object Interface Definition Language (OIDL)

The invention redefines language dependent object definitions as a neutral set of information from which object support for any language is provided. The neutral set of information is referred to as an Object Interface Definition Language (OIDL) definition in SOM. SOM OIDL provides the basis for generating binding files that enable programming languages to use and provide SOM objects and their definitions (referred to as classes). Each OIDL file defines the complete interface to a class of SOM objects.

OIDL files come in different forms for different languages. The different forms enable a class implementer to specify additional language-specific information that allows the SOM Compiler to provide support for constructing the class. Each of these different forms share a common core language that specifies the exact information that a user must know to use a class. One of the facilities of the SOM Compiler is the extraction of the common core part of a class definition. Thus, the class implementer can maintain a language-specific OIDL file for a class, and use the SOM Compiler to produce a language-neutral core definition as needed.

This section describes OIDL with the extensions to support C-language programming. As indicated above, OIDL files are compiled by the SOM Compiler to produce a set of language-specific or use-specific binding files.

The SOM Compiler produces seven different files for the C language.
  A public header file for programs that use a class. Use of a class include creating instance objects of the class, calling methods on instance objects, and subclassing the class to produce new classes.
  A private header file, which provides usage bindings to any private methods the class might have.
  An implementation header file, which provides macros and other material to support the implementation of the class.
  An implementation template, which provides an outline of the class' implementation that the class provider can then edit.
  A language-neutral core definition.
  A private language-neutral core file, which contains private parts of the class interface.

An OS/2 .DEF file that can be used to package the class in the form of an OS/2 DLL.

OIDL files can contain the following sections:
Include section;
Class section;
Release Order section;
Metaclass section;
Parent Class section;
Passthru section;
Data section; and
Methods section.

Include Section

This required section contains an include statement that is a directive to the OIDL preprocessor telling the compiler where to find the class interface definition for this class' parent class, the class' metaclass if the class specifies one, and the private interface files for any ancestor class for which this class overrides one or more of its private methods.

Class Section

This required section introduces the class, giving its name, attributes and optionally a description of the class as a whole.

Release Order Section

This optional section contains a release order statement that forces the compiler to build certain critical data structures with their items arranged in the order specified. This allows the class interface and implementation to be evolved without requiring programs that use this class be recompiled.

Release order applies to all method names and public data items. If the release order of some method or public data item is not specified, it will default to an implementation-specific order based on its occurrence in the OIDL file. The introduction of new public data items or methods might cause the default ordering of other public data items or methods to change; programs using the class would then need to be recompiled.

Metaclass section

This optional section specifies the class' metaclass, giving its name and, optionally, a description of the reason for the metaclass, or other comments about its role in this class' interface. If a metaclass is specified, tis definition must be included in the include section. If no metaclass is specified, the metaclass of this class' parent class will be used.

A class' metaclass can also be implicitly defined through the combined use of the class attribute in the data section and the class attribute in the method section. If either of these attributes are used, then the metaclass section must be bypassed. In this case, the implied metaclass will be a subclass of the metaclass of the parent class.

Parent Class Section

This required section specifies the class' parent class by indicating the name and optionally a description of the role of the parent class in this class' interface.

Passthru Section

This optional section provides blocks of code to be passed by the compiler into various binding files. The contents of the passed information are ignored by the compiler. Even comments contained in passthru lies are processed without modification.

Data Section

This optional section lists the instance variables for this class. This section i s generally present only in the language specific version of the class interface definition (a. CSC file). However, it must be present in the public form of the class interface definition if the class contains public instance variables. ANSI C syntac is used to describe these variables.

Methods Section

This optional section lists the methods supported by this class. ANSI C function-prototype syntax is used to define the calling sequence to each method.

SOM Compiler

The SOM Compiler translates the OIDL source definition of a SOM class into a set of bindings appropriate for a particular programming language. The SOM Compiler supplied with the OS/2.0 toolkit produces a complete set of bindings for the C programming language.

The compiler operates in two phases—a precompile phase and an emission phase. In the first phase a precompiler reads and analyzes a user-supplied class definition and produces intermediate output files containing binary class information, comments and passthru lines. In the second phase, one or more emitter programs run to produce the appropriate language binding files. Two additional programs serve as preprocessors for the SOM precompiler phase. The sequencing and execution of all of these programs is directed by the SOM Compiler.

The output from the emitters, plus user-supplied logic for the class' methods, are subsequently compiled by the C compiler and linked by the OS/2 linker to create a loadable module. Loadable modules can be packaged in self-contained files or placed in a DLL so the class can be used from many programs.

Figure 4:
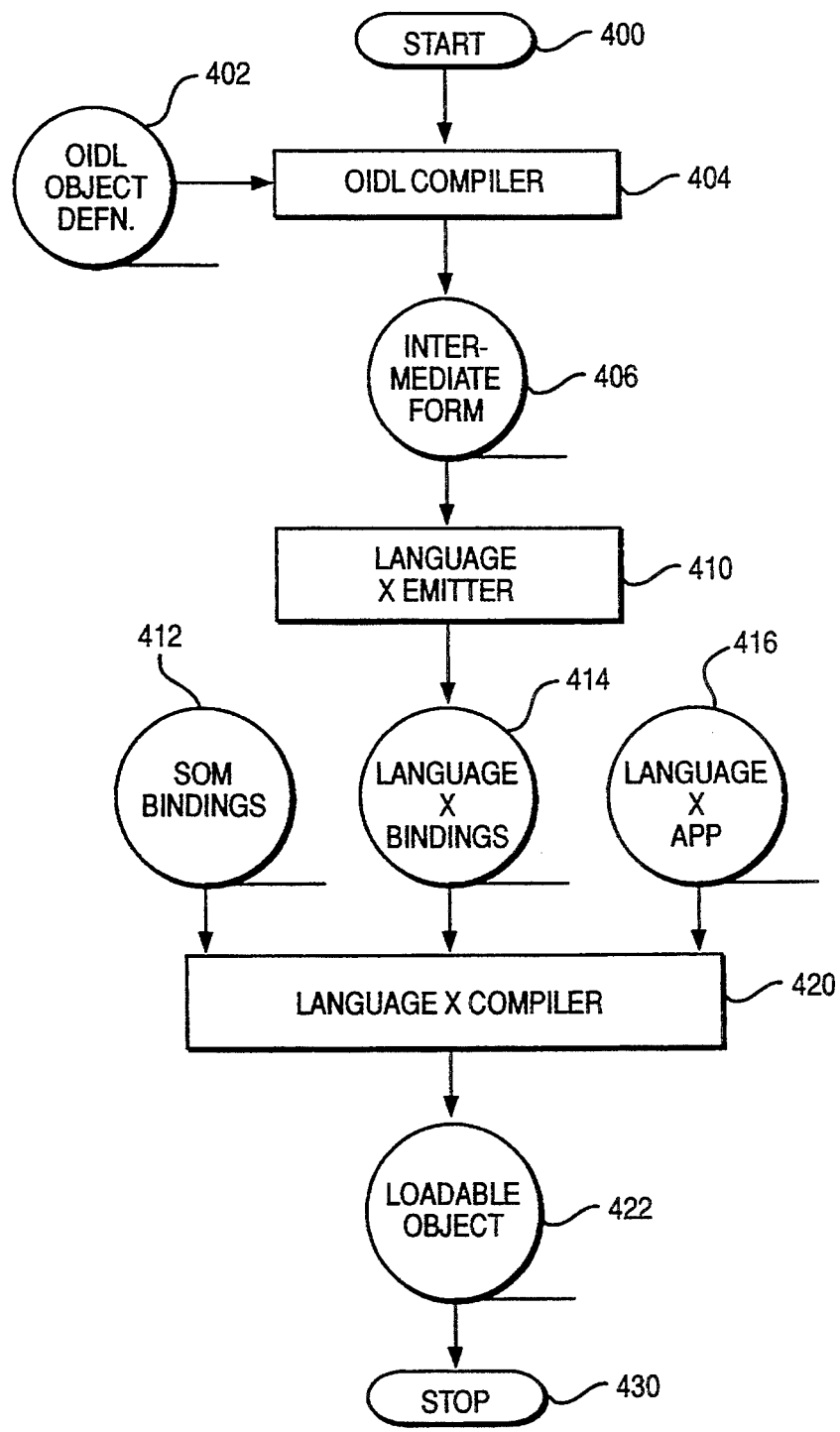
FIG. 4 is a flowchart depicting a language neutral object interface in accordance with the subject invention.

Referring to FIG. 4, control commences at terminal 400 and flows directly into function block 404 where a SOM language neutral object interface definition (OIDL) 402 is input to the SOM OIDL compiler 404. The SOM OIDL compiler parses the object definitions in OIDL into a canonical form 406 to simplify the code generation process as input to the target language emitter 410. The language emitter 410 generates language bindings 414 which include the class data structure depicted in FIG. 3. Control flows to the language compiler shown in function block 420 which receives additional inputs from the language applications 416 and the SOM bindings 412. The language compiler could be a C, Fortran, Cobol or other compiler depending on user preference. Output from the language compiler is an object file 422 which can be link edited with the SOM runtime library for subsequent execution.

Figure 5:
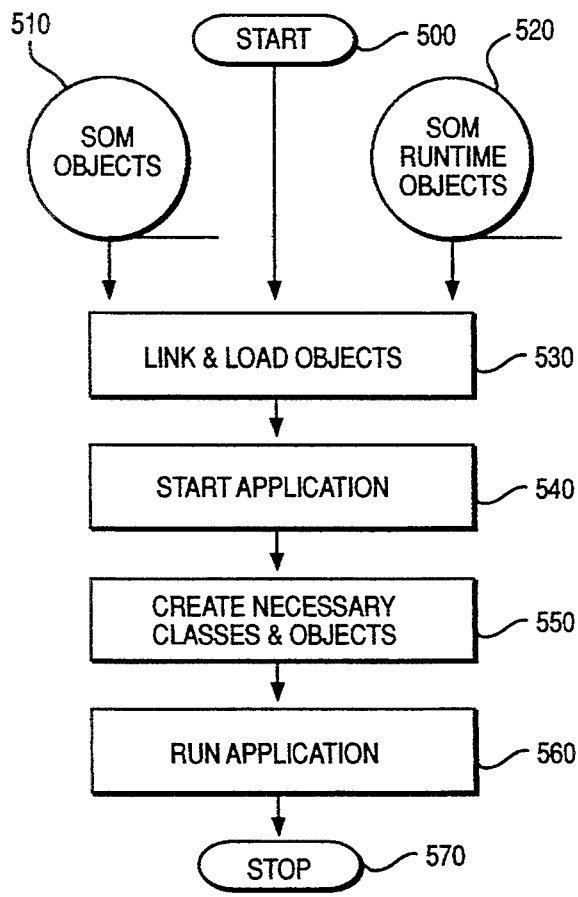
FIG. 5 is a flowchart depicting a link, load and execution of an application using SOM objects in accordance with the subject invention.

FIG. 5 is a flowchart depicting a link, load and execution of an application using SOM objects in accordance with the subject invention. Processing commences at terminal 500 and immediately flows into function block 530 for a dynamic link and load of the SOM objects 510 created in FIG. 4 at label 422 and the SOM run time library 520. Then, at function block 540, the application is started, which invokes the creation of necessary classes and objects as set forth in function block 550 and detailed in FIGS. 6, 7, 8, 9 and 10. Finally, the application is executed as shown in function block 560 and control is terminated at terminal block 570.

Version Independence For Object Oriented Programs

This aspect of the invention generally relates to improvements in object oriented applications and more particularly solving problems arising from the independent evolution of object definition libraries and the computer applications that use them.

The version independence processing isolates the executable binary form of computer applications that use object definition libraries (also called object class libraries) from certain changes in the implementations or specification of the object definitions that naturally arise during the lifecycle of the libraries. Specifically, the following changes can be made to an object definition without compromising its use by the unmodified executable binary form of a computer application which dynamically loads the object definition each time the application is executed;

1) add new methods to an object definition;
2) move the point of definition for a method from a child class to its parent class;
3) add to, delete from, or otherwise change the private instance data associated with an object definition; and
4) insert a new class definition into a class hierarchy.

This processing is accomplished by the operation of an algorithm in the memory of a processor employing several techniques as follows. Method and instance offset are removed from application binary images. In static object models, such as the one defined in C++, an offset (an integer number) into a method procedure table is used to select a method procedure for each particular method name. The offset depends on the number and order of the methods of the class the method is defined in and the number of methods defined by its ancestors.

This approach has the benefit of being a very fast form of method resolution. However, in the prior art object models have placed these offsets in the binary images of the applications that used a particular object class, resulting in the requirement to recompile the application whenever the offsets required a change.

In SOM, the offsets associated with methods are collected into a single memory data structure for each class, called the class data structure, detailed in the discussion of FIG. 3. This data structure is given an external name and its contents are referred to in applications. Each class data structure is initialized to contain the appropriate offset values when a class object is initialized as detailed in FIG. 10. Thus each time an application is executed all the offset values are recalculated based on the current definitions of the classes used by the application.

Note that any references in an application's binary images to the values stored in the class data structure containing offsets. However, these offsets can remain constant across the four kinds of changes enumerated above. This is because the class data structure only contains offsets for the methods defined in a particular class, not for offsets of methods inherited by the class. Thus, new methods added to a class can have their offsets added at the end of the class data structure without disturbing the positions of the offset values for methods that were already defined in the class.

The SOM Object Interface Definition Language (OIDL) contains a Release Order Section, discussed in the section titled "SOM Object Model" above. The release order section of OIDL allows the class implementor to insure that new method offset values are added after the method offset values for methods already defined in a class. The release order section in an OIDL file also causes an entry to be retained in a class data structure if one of the methods defined in the class is moved to a parent class as highlighted in FIG. 3. This entry is then initialized from the parent offset value by a simple assignment statement that the OIDL compiler adds the logic initializing the class data structure as described in FIG. 10.

A similar problem arises with public instance data. An application that accesses a public instance variable contained in one of the application's object's state data structure must do so via a offset into the object's state data structure. In the prior art, this offset was contained in application's binary image. If this technique is employed, then the application's binary image must be regenerated (via recompilation) any time the offset changes due to a change in the size of one or more of the object's ancestor classes' instance data requirements or due to changes in the object's own instance data layout.

In SOM this problem is solved by putting the offset for each public data variable in the class data structure detailed in FIG. 3 and the ensuing discussion. Each class data structure is initialized to contain the appropriate offset values when the class object is initialized as detailed in FIGS. 7 and 13. Thus, each time an application is executed all the offset values are recalculated based on the current definitions of the classes used by the application.

Remove object state data structure sizes from applications' binary images

When new instances of objects are created, a correct amount of computer memory must be allocated to hold the object's state data structure. In the prior art, the size of this block of memory was contained in an application's binary image. If this technique is employed, then the application's binary image must be regenerated (via recompilation) any time the size of the object's state data structure changes. In SOM, this value is available via a call to the object's class object and therefore need not be contained in an application's binary image.

The techniques described above allow each of the four changes previously highlighted to occur with respect to class definitions used by an application without requiring that the application's binary image to be regenerated.

Figure 6:
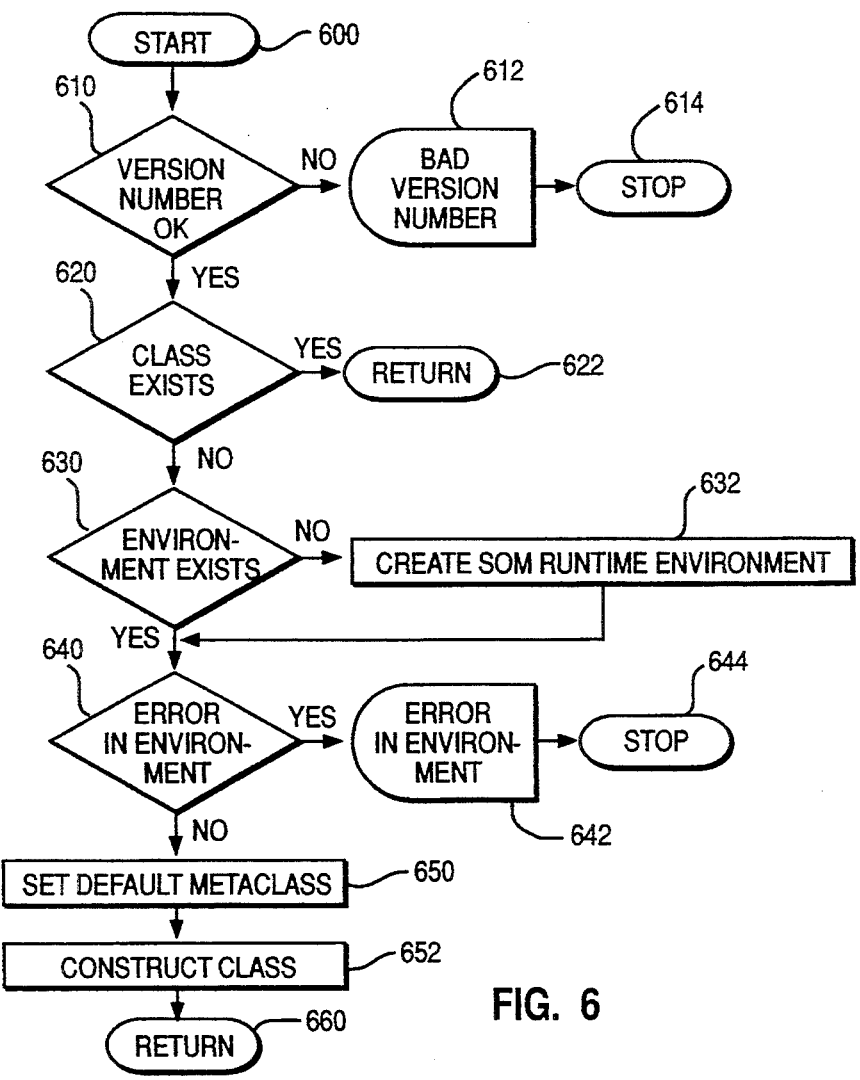
FIG. 6 is a flowchart depicting the creation of a new SOM class in accordance with the subject invention.

FIG. 6 is a flow chart depicting the creation of a new SOM class in accordance with the subject invention. Control commences at terminal 600 which flows immediately into a test for a correct version number at decision block 610 where a check is performed to verify the correctness of the version number. If an incorrect version number is detected, then a message is displayed in output block 612 and control is terminated at terminal block 614. If a correct version number is detected, then another test is performed at decision block 620 to determine if the SOM class exists. If the SOM class exists, then processing is returned at terminal block 622.

If the SOM class does not exist at decision block 620, then a test is performed at decision block 630 to determine if the SOM runtime environment is active. If it is not active, then the SOM runtime environment is invoked at function block 632. Whether the SOM environment was initially present or not, control then flows to decision block 640 to check for an error in the SOM environment at decision block 640. If an error is detected, then an appropriate message is presented at output block 642 and processing is terminated at terminal block 644. If an error is not detected, then control passes to function block 650 where a default metaclass is prepared. Next, a class is constructed in function block 652 as detailed in FIG. 7. Finally, processing is returned at terminal block 660.

Figure 7:
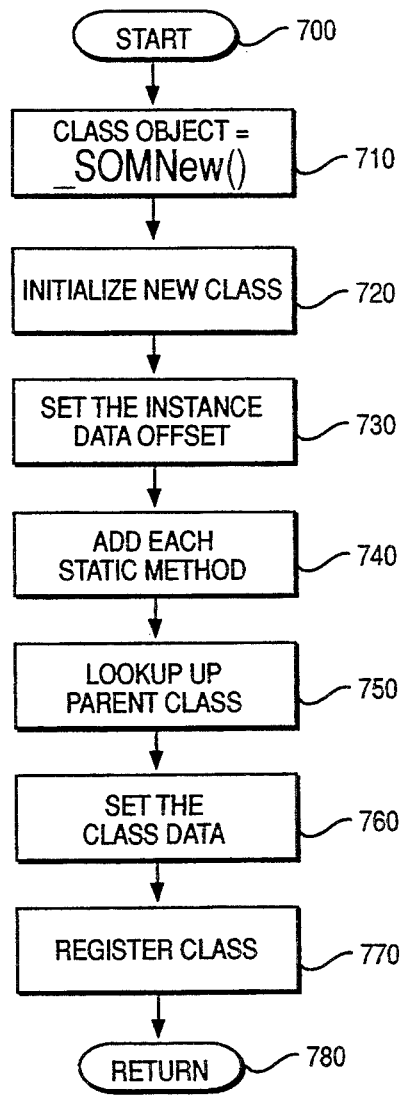
FIG. 7 is a flowchart depicting the detailed construction of a new SOM class in accordance with the subject invention.

FIG. 7 is a flowchart depicting the detailed construction of a new SOM class in accordance with the subject invention. Control commences at terminal 700 and flows immediately into function block 710 where a generic class object is created as detailed in FIG. 8. Next, the new generic class is initialized to default values at function block 720 and detailed in FIG. 9. Then, at function block 730, the instance data offset is initialized for the particular new class. Control flows to function block 740 where the class data structure (FIG. 3) for the new class is initialized by assigning values representing each static method for the new class as detailed in FIG. 10.

At function block 750, 760 and 770 the parent class is set, the class data is initialized and the class is registered. These steps involve updating the new class data structure as detailed in the discussion of FIGS. 2, 10 and 13. Finally, control is returned at terminal 780.

Figure 8:
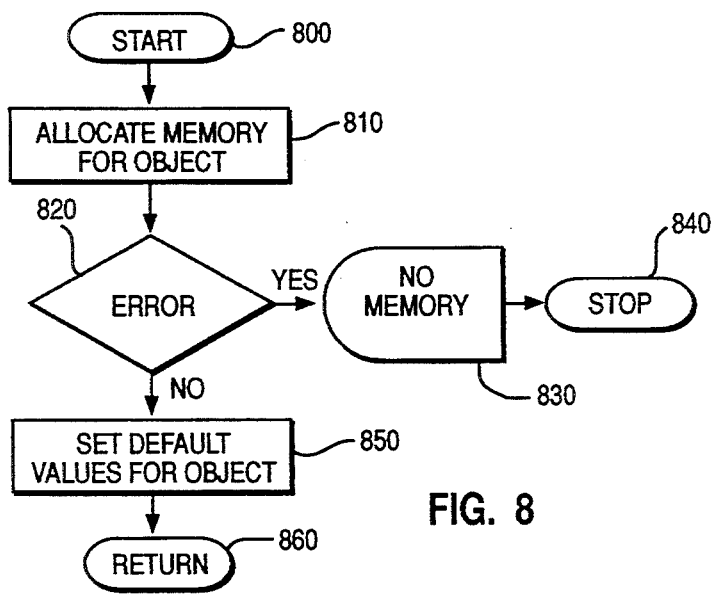
FIG. 8 is a flowchart depicting the detailed construction of a new SOM generic class object in accordance with the subject invention.

FIG. 8 is a flowchart depicting the detailed construction of a new SOM generic class object in accordance with the subject invention. Control commences at terminal 800 and immediately flows into function block 810 where memory is allocated for the object. Then, a test is performed at decision block 820 to determine whether the memory was allocated. If an error is detected, then an appropriate error message is displayed at output block 830 and processing is terminated at terminal block 840. If no error is detected, then the default values of the object are set at function block 850 and control is returned at terminal block 860.

Figure 9:
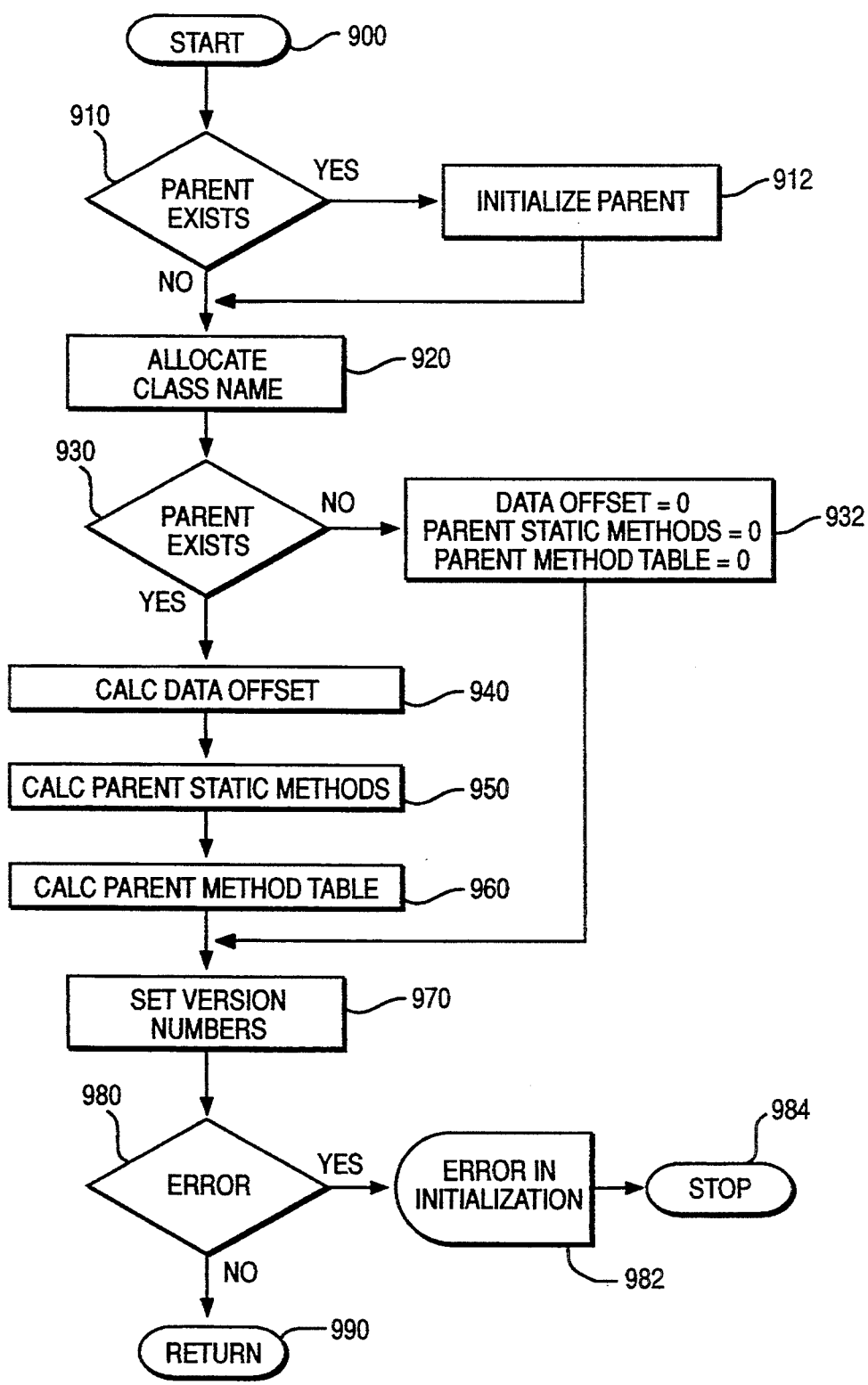
FIG. 9 is a flowchart depicting the detailed initialization of a new SOM class object in accordance with the subject invention.

FIG. 9 is a flowchart depicting the detailed initialization of a new SOM class object in accordance with the subject invention. Control commences at terminal 900 and immediately enters a decision block 910 and a test is performed to detect if the parent class of the new SOM class object exists. If a parent class exists, then the parent class is initialized in function block 912. Once the parent class is initialized, then memory for the class name is allocated at function block 920. Next, a test is performed again to detect if the parent class of the new SOM class object exists at decision block 930.

If a parent class does not exist, then initial variables are set to zero as shown in function block 932 and control passes to function block 970. If a parent class exists, then the initial variables are updated based upon the values from the parent class in function blocks 940, 950, and 960. Then, in function block 970, the version number for the class is set and error processing is performed in decision block 980. If an error is detected, then an appropriate message is displayed at output block 982 and processing terminates at terminal block 984. If no error is detected, then control is returned at terminal block 990.

Figure 10:
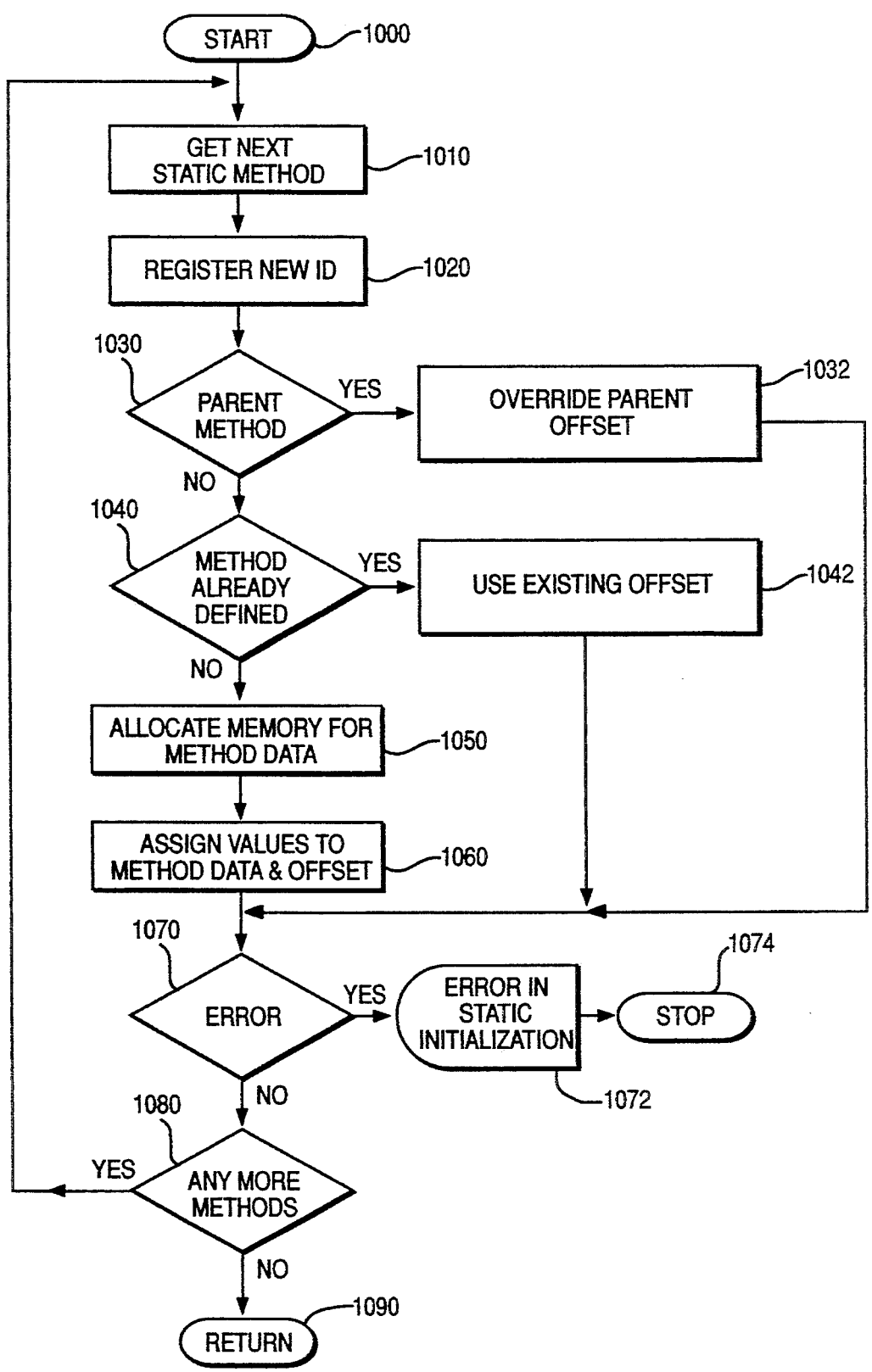
FIG. 10 is a flowchart depicting the detailed initialization of a SOM class data structure with offset values in accordance with the subject invention.

FIG. 10 is a flowchart depicting the detailed initialization of a SOM class data structure with offset values in accordance with the subject invention. Control commences at terminal block 100 and immediately flows into function block 1010 where a loop commences with the acquisition of the next static method. In function block 1020, the new method id is registered with the SOM runtime environment. Then, a test is performed to determine if the method has already been registered in a parent class in decision block 1030. If the method has been registered, then the method offset is overridden at function block 1032 and control passes to decision block 1070.

If the method has not been registered with any parent class, then a test is performed to determine if the method has been defined in the current class at decision block 1040. If the method has been defined, then the existing offsets are employed at function block 1042 and control is passes to decision block 1070. If the method has not been defined, then memory is allocated and values are initialized in function blocks 1050 and 1060. In function block 1060 the offset is calculated by adding the number of inherited static methods to the number of inherited static methods processed to date by the class. Error processing is performed in decision block 1070, and if an error is detected, then an appropriate message is displayed at output block 1072 and processing terminates at terminal block 1074. After error processing is completed, another test is performed at decision block 1080 to determine if any additional methods require processing. If there are additional methods, then control passes to function block 1010 for the next iteration of the loop. Otherwise, control flows to terminal 1090 where control returns.

Parent Class Shadowing

Logic for providing a dynamic insertion of a replacement parent class, referred to in object programming as a parent class shadow, is detailed in this section of the invention. This processing allows the statically compiled definition of what parent class is linked to a particular class at runtime to be dynamically altered during execution. The ability to insert a new parent class into a statically compiled class hierarchy offers more flexibility to maintain and enhance existing code after it has appeared in binary form. It also offers a new degree of freedom for customizing code without access to source materials since this result can be achieved without recompilation.

Prior art systems have inherent limitations associated with statically linking derived classes and their parent classes. These limitations include, computation of the size of the derived object state data structure, initialization of the derived method procedure table, and the inability to provide access to a parent class' methods from within the derived class' methods (called parent class resolution).

The SOM object model removes these static references by having all the parent class information available at runtime through the parent class object. Thus, when the derived class implementation needs information about the size of the parent class' state data structure, the addresses of the parent class' method procedures, or access to the parent class' method procedure table (to support parent class resolution) an appropriate call is placed to acquire the information from the parent class object. The detailed processing to obtain this information are given in FIGS. 7, 8, 9, and 10.

SOM introduces a class manager for every SOM process. The class manager is responsible for keeping a registry of classes. The class construction code generated by the SOM compiler works with the class manager to establish the relationship between a class and its parent class whenever a child class object is created.

The SOM class manager is an instance of a class which can be subclassed like any other SOM class.

Derived classes establish a connection to their parent class object by making calls on the SOM Class Manager object. An application designer wanting to substitute an alternate class implementation for the original class implementation follows the following steps:

1) Subclass SOMClassMgr providing a new set of application specific rules for determining a class object from a class name (i.e., changing the implementations of somClassFromId, somFindClass, and somFindClsInFile)

A simple and useful was to do this is to add a method to register a shadow class object under an existing class name and then return the shadow class object to the calling application in any subsequent calls to somClassFromId, somFindClass, or somFindClsInFile where the shadowed name is specified.

2) Before creating any derived class objects that are to have a shadowed parent class object, create an instance of the new class manager class (as described in step 1 above), initialize it from the existing SOMClassMgr instance (via the somMergeInto method), and then replace the existing SOMClassMgr instance with the new class manager instance by overriding the address of the existing SOMClassMgr instance in the SOM runtime.

3) Still before creating any derived class objects that are to have a shadowed parent class object, use the facilities of the application specified class manager object to register the shadow class objects.

Figure 11:
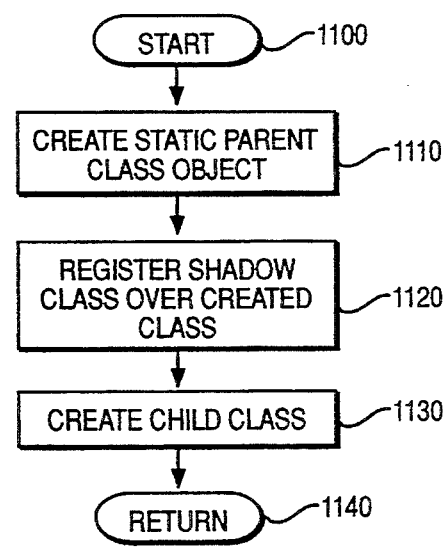
FIG. 11 is a flowchart depicting the detailed parent class shadowing of a statistically defined class hierarchies in accordance with the subject invention.

After the above three steps have been completed, derived class objects can be created. They will be linked to the appropriate parent shadow class objects. This will work because of the specific logic used to initialize a class object and link to its parent class object as depicted in FIG. 11. This logic consists of two basic steps:

1) First, a call is made to insure that he statically known parent class object has been created. This serves two important purposes:
    (a) It creates a static reference to the binary image of the statically known parent class definition, thus insuring that the parent class implementation will be linked into the binary image of the application.
    (b) It insures that the at least the statically known parent class object has been registered with the SOM class manager object before the next step occurs.

If the statically known parent class object has already been created (say by an application following the shadowing steps discussed above) then a second attempt at this time is ignored.

2) Second, a call is made to the SOM class manager object to retrieve the address of the appropriate class object based on the name of the derived class' parent class. If the parent class has been shadowed then this call will return the shadow class object.

The combination of the techniques and mechanism described above effectively isolate a derived class' binary image from any dependency on the exact class of the class object that the derived class uses to extract parent class data from.

Two restrictions must be observed when inserting a new class between a child class and its parent class. First, the insertion must be accomplished before any instances of the child class have been created. Second, the inserted class must also be an immediate child of the original parent class. Because the SOM class manager is used as an intermediary when establishing the relationships between classes at run time, even a statically linked class can be shadowed in this manner.

FIG. 11 is a flowchart depicting the detailed parent class shadowing of a statically defined class hierarchies in accordance with the subject invention. Control commences at terminal block 1100 and immediately flows into function block 1110 where the statically defined parent class object is created. Next, the shadow parent class is created and used to override the statically defined parent class at function block 1120. Then, the child class is created as shown in function block 1130 and the child class interrogates the SOM class manager to ascertain its current, rather than statically defined, parent class. Control returns at terminal block 1140.

Redispatch Method Stubs

A central aspect of object oriented programming is referred to as method resolution. This processing selects a particular method given an object, the method's id and the arguments passed to the method invocation. In many object models, such as the one used in C++, method resolution consists of determining an offset into an object specific table of procedure entry points based on an analysis of the program's source code. This type of resolution is referred to in object models as static. In other object models such as the one used in Smalltalk, a more dynamic model is used that consists of using the name of the object to determine a specific method at runtime. In object models this is referred to as dynamic.

The invention consists of a programming mechanism called redispatch stubs to ameliorate the difference between static and dynamic models. A redispatch stub is a small procedure with an entry point that can be placed into a table of procedure entry points. The table of procedure entry points are used in a static object model as a substitute for the actual method entry point that is expected. The redispatch stub is generated automatically based on the requirements of the dynamic object model. The redispatch stub converts the call generated in the static object model into the form necessary in the dynamic object model and supplies any missing information in the process. Thus, if an object is accessed from a static object model that is provided by a dynamic object model, it can be represented to the static object model via a table of entry points which each indicate a particular redispatch stub.

Figure 12:
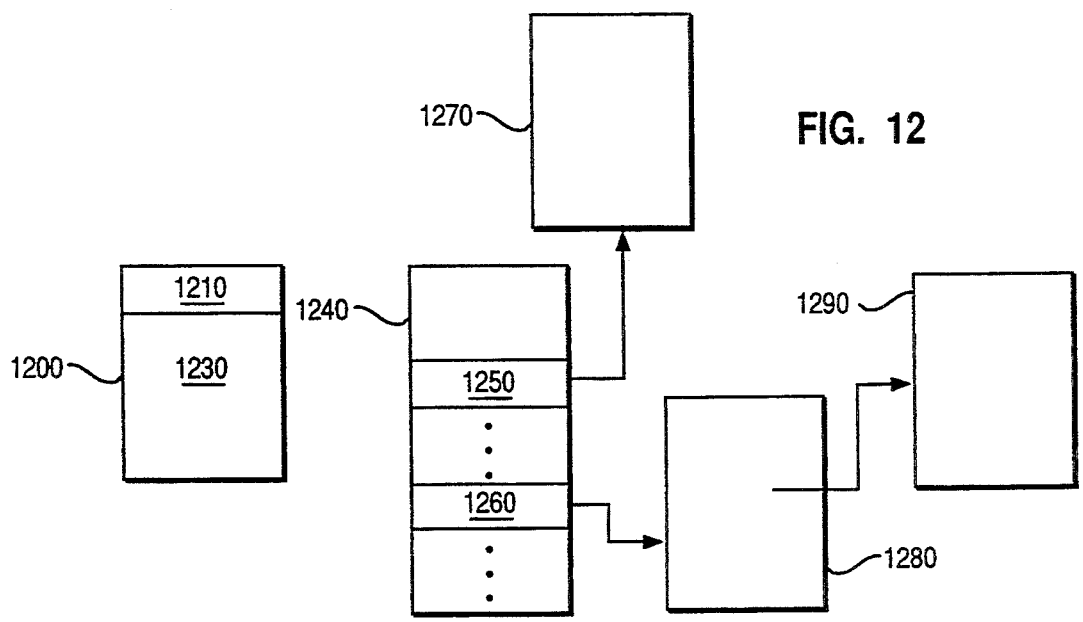
FIG. 12 is a flow diagram depicting the redispatch method in accordance with the subject invention.

FIG. 12 is a flow diagram depicting the redispatch method in accordance with the subject invention. Label 1200 is a state data structure for a particular object. The first full word at label 1210 contains the address of the object's method procedure table label 1240. The rest of the state data structure is set forth at label 1230 contains additional information pertaining to the object. The method procedure table set forth at label 2140 containing the addresses of various methods for the particular object. All objects that are of the same class as this object also contain an address that points to this method procedure table diagrammed at label 1240. Any methods inherited by the objects will have their method procedure addresses at the same offset in memory as they appear in the method procedure table as set forth an label 1240 of the ancestor class from which it is inherited.

In the figure, label 1250 contains a pointer to a redispatch stub 1270. A redispatch stub is a sequence of instructions that appear as a method to a client program. However, the instructions merely convert the method call into a call to an object's appropriate dispatch function as illustrated at label 1260. The address at label 1260 is a pointer to the object's dispatch function 1280. All SOM objects have a dispatch function. The dispatch function 1280 implements an algorithm to select a particular method based on the parameters passed by the redispatch stub. These parameters include the method's identifier, a string describing a set of arguments passed to the identified method, and a data structure containing the set of arguments.

Offset Values

Figure 13:
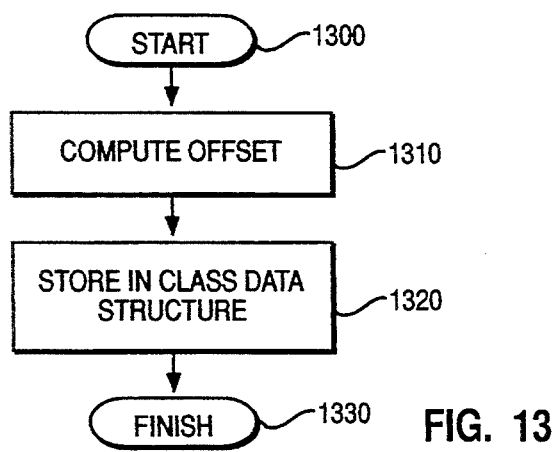
FIG. 13 is a flowchart depicting the detailed initialization of the offset value in a SOM class data structure for a single public instance variable in accordance with the subject invention.

FIG. 13 is a flowchart depicting the detailed initialization of the offset value in a SOM class data structure for a single public instance variable. This logic sequence is repeated for each public instance variable defined in a particular class (see the discussion of the OIDL Data Section above). Control commences at the terminal block 1300 and immediately flows into the function block 1310 where the offset of the instance variable is calculated by adding the instance variable's offset within this class' object data to the offset of the beginning of this class' object state data within the object state data structure set forth in FIG. 2 at label 230.

The beginning of the class' object state data is determined by adding up the sizes of each of this class' ancestor classes' object state data. Control then passes to function block 1320 when the calculated offset is stored into the position in the class data structure as determined by the position of the public instance variable's name in the OIDL files Release Order Section (see the OIDL Release Order section above and FIG. 3 above). Control then flows to the terminal block 1330 and the process is complete.

Redispatch Stubs

Figure 14:
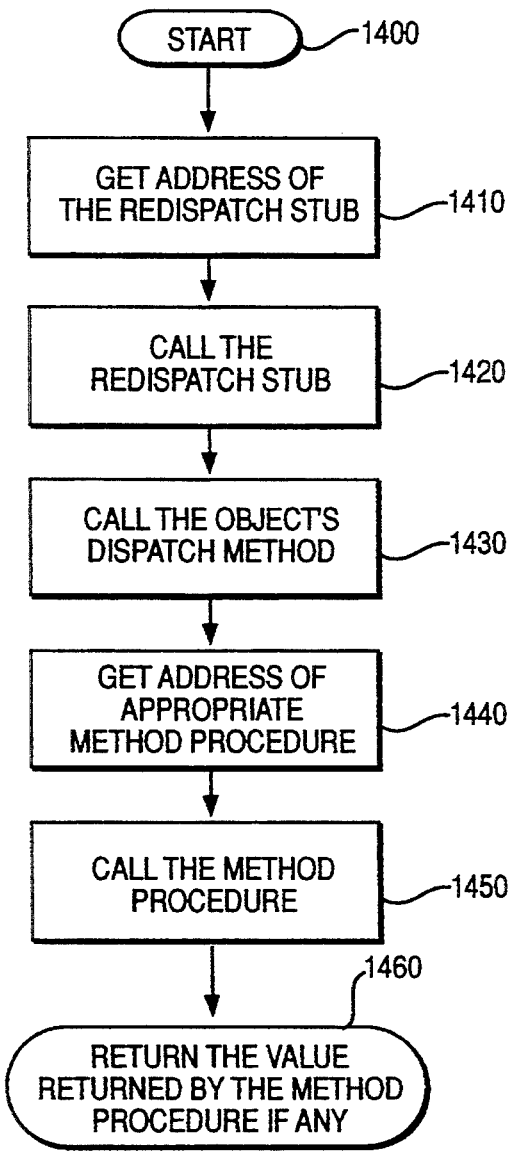
FIG. 14 is a flowchart depicting the detailed control flow that occurs when a redispatch stub is employed to convert a static method call into a dynamic method call in accordance with the subject invention.

FIG. 14 is a flowchart depicting the detailed control flow that occurs when a redispatch stub is employed to convert a static method call into a dynamic method call. Control commences at the terminal block 1400 and immediately flows into the function block 1410 where the address of the redispatch stub is determined in the normal static method resolution manner by getting the address stored in the object's method procedure table at an offset contained in the appropriate class data structure at position determined when the class was defined.

Control then passes to function block 1420 where the redispatch stub is called exactly like it was the real static method procedure. Function block 1430 depicts how the redispatch stub calls the object's dispatch method 50 (using normal method resolution as described above). The redispatch stub adds the method's identifier and descriptor to the call as required by the object's dispatch method. These values are incorporated into the redispatch function definition when it is generated by the SOM OIDL compiler. (Note: as detailed in the definition of the SOMObject class above, all classes must support dispatch methods). The object's dispatch method procedure determines which actual method procedure should be called using an algorithm specific to the object's class as shown in function block 1440.

SOM provides a default implementation of such an algorithm that looks the method's identifier up in a table contained in the object's class object to determine the address of a method procedure. Other object models might use other algorithms. Control then passes to function block 1450 where the method procedure determined in block 1440 is called. When the method procedure returns its return value if any is returned to the original caller of the redispatch stub at terminal block 1460. The redispatch stub allows the original static method call to be converted to one of arbitrary dynamics without requiring any changes to the application program that is manipulating the object.

Method Procedure Table Initialization

Figure 15:
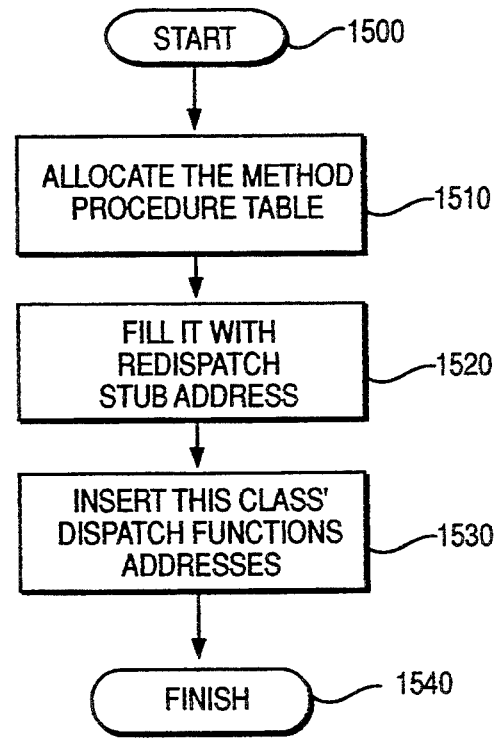
FIG. 15 is a flowchart depicting the detailed control flow that initialize a method procedure table for a class in accordance with the subject invention.

FIG. 15 is a flowchart depicting the detailed control flow that will properly initialize a method procedure table for a class that may change the association of method procedures to method during the execution of an application using the class. Control commences at terminal block 1500 and immediately flows into function block 1510 where space is allocated for the method procedure table. Enough space is allocated to contain an entry for the address of the class' object and each of the method inherited or defined by the class in accordance with FIG. 7. Control then passes to function block 1520 where each method entry in the method procedure table is replaced by its redispatch stub. Redispatch stubs for inherited are determined by requesting them from the class' parent class. Redispatch stubs for the class are generated by the SOM compiler and supplied to the class initialization procedure in the calls to register each of the class' static method. Control then passes to function block 1530 where the method procedure table entries for the class' dispatch function are replaced by the actual address of the class' dispatch function (it is never correct to have a redispatch stub address in a dispatch function slot as this would result in a infinite loop). Finally control passes to the terminal block 1540 and processing is complete.

While the invention has been described in terms of a preferred embodiment of a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A system for generating language specific interface definitions for one or more of a plurality of programming languages from a language neutral source program, said interface definitions providing access to an object-oriented programming object by said one or more of a plurality of programming languages, comprising:

(a) storage means for storing the language neutral source program;

(b) means for processing the stored language neutral source program;

(c) means for testing to determine for which of said plurality of languages said language specific interface definitions are required; and (d) means for generating language specific interface definitions from said processes language neutral source program for said determined languages.

2. The system of claim 1, wherein the interface definitions for two or more languages are required, and said means for generating generates two or more language specific interface definitions.

3. A computer implemented method for generating executable code from programs written in two or more programming languages based on a single language neutral object definition, said two or more programming languages each having a syntax, the method comprising the steps of:

storing said language neutral object definition, in a syntax different from said two or more programing language syntaxes;

generating a plurality of interface definitions each following the syntax of one of said two or more programming languages;

merging object implementation source code with one of said interface definitions to form an object implementing program;

merging object use source code with a different one of said interface definitions to form an object using program;

compiling said object implementing program with a first compiler to create executable code, and compiling said object use program with a second compiler to create executable code.

* * * * *

UNITED STATES PATENT AND TRADEMARK OFFICE
CERTIFICATE OF CORRECTION

PATENT NO. : 5,428,792

DATED : June 27, 1995

INVENTOR(S) : Mike H. Conner, Andrew R. Martin and Larry K. Raper

It is certified that error appears in the above-identified patent and that said Letters Patent is hereby corrected as shown below:

Col. 2, line 54, delete "statistically", insert --statically--;

Col. 9, line 47, delete "<student.>", insert --<student.c>--;

Col. 14, line 59, delete "SOMobject", insert --SOMObject--;

Col. 17, line 1, delete "different", first occurrence, insert --Different--;

Col. 18, line 49, delete "SOMobject", insert --SOMObject--;

Col. 19, line 44, delete "SOMclass", insert --SOMClass--;

Col. 21, line 34, delete "somGetClassMtabe", insert --somGetClassMtab--;

line 42, delete "*redispatchStud", insert --*redispatchStub--;

line 43, delete "somMoffset", insert --somMOffset--;

Col. 22, line 13, delete "return", insert --returns--;

line 36, delete "somSElf", insert --somSelf--;

Col. 31, line 13, delete "was", insert --way--;

line 38, delete "he", insert --the--;

line 58, delete "mechanism", insert --mechanisms--;

UNITED STATES PATENT AND TRADEMARK OFFICE
CERTIFICATE OF CORRECTION

PATENT NO. : 5,428,792
DATED : June 27, 1995
INVENTOR(S) : Mike H. Conner, Andrew R. Martin and Larry K. Raper It is certified that error appears in the above-identified patent and that said Letters Patent is hereby corrected as shown below:

Col. 34, line 35, delete "of", insert --in--;

line 57, delete "processes", insert --processed--; and line 59, after "wherein", delete "the".

Signed and Sealed this

Eighteenth Day of February, 1997

Attest:

BRUCE LEHMAN

Attesting Officer     Commissioner of Patents and Trademarks